(12) United States Patent
Hao et al.

(10) Patent No.: US 12,184,545 B2
(45) Date of Patent: Dec. 31, 2024

(54) PACKET PROCESSING METHOD AND RELATED APPARATUS

(71) Applicant: Huawei Technologies Co., Ltd., Guangdong (CN)

(72) Inventors: Weiguo Hao, Nanjing (CN); Dongdong Li, Nanjing (CN); Huafeng Wen, Nanjing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 285 days.

(21) Appl. No.: 17/577,579

(22) Filed: Jan. 18, 2022

(65) Prior Publication Data

US 2022/0231942 A1  Jul. 21, 2022

(30) Foreign Application Priority Data

Jan. 19, 2021 (CN) .......................... 202110071068.9

(51) Int. Cl.
*H04L 45/00* (2022.01)
*H04L 45/745* (2022.01)
*H04L 61/103* (2022.01)

(52) U.S. Cl.
CPC .............. *H04L 45/66* (2013.01); *H04L 45/20* (2013.01); *H04L 45/745* (2013.01); *H04L 61/103* (2013.01)

(58) Field of Classification Search
CPC ....... H04L 45/66; H04L 45/20; H04L 45/745; H04L 61/103; H04L 45/245; H04L 45/24; H04L 45/74
See application file for complete search history.

(56) References Cited

U.S. PATENT DOCUMENTS

| | | | |
|---|---|---|---|
| 8,953,590 B1 | 2/2015 | Aggarwal et al. | |
| 9,178,816 B1 | 11/2015 | Ojha et al. | |
| 10,079,711 B1* | 9/2018 | Hayes | H04L 41/0895 |
| 2015/0319074 A1* | 11/2015 | Ruan | H04L 12/6418 |
| | | | 370/392 |
| 2019/0182202 A1* | 6/2019 | Garcia Del Rio | H04L 49/70 |
| 2022/0070085 A1* | 3/2022 | Ji | H04L 12/4633 |

* cited by examiner

*Primary Examiner* — Charles C Jiang
*Assistant Examiner* — Shawn D Miller
(74) *Attorney, Agent, or Firm* — WOMBLE BOND DICKINSON (US) LLP

(57) ABSTRACT

This application provides a packet processing method and a network device. A third network device is multi-homed to a first network device and a second network device, the first network device is configured with a first physical MAC address and a virtual MAC address, the second network device is configured with a second physical MAC address and the virtual MAC address, and the virtual MAC address is used to forward a user data packet to a network side. The method includes: a first network device receives a protocol packet from a third network device, where the protocol packet includes the second physical MAC address; and the first network device forwards the protocol packet to the second network device based on the second physical MAC address. Thus, the protocol packet can be normally forwarded without special configuration on a server, so that a cumbersome configuration process is avoided.

18 Claims, 11 Drawing Sheets

IP packet header

| Version | Header length | Service type | Total length | |
|---|---|---|---|---|
| Identifier | | | Flag | Fragment offset |
| Time to live | | Agreement | Header check | |
| Source IP address | | | | |
| Destination IP address | | | | |

FIG. 3b

Ethernet packet header

| Destination address | Source address | Type |
|---|---|---|

FIG. 3c

PACKET PROCESSING METHOD AND RELATED APPARATUS

CROSS-REFERENCE TO RELATED APPLICATION

This application claims priority to Chinese Patent Application No. 202110071068.9, filed on Jan. 19, 2021, which is hereby incorporated by reference in its entirety.

TECHNOLOGY

This application relates to the field of communications technologies, and in particular, to a packet processing method and a related apparatus.

BACKGROUND

In a data center network, a server may be dual-homed to two switches in active-active access mode. The two switches implement load balancing for the server. This networking mode is referred to as a multi-chassis link aggregation group (M-LAG). The M-LAG is a networking mode that implements cross-device link aggregation, so that link aggregation between a plurality of devices can be implemented. This improves link reliability.

In the M-LAG networking mode, the two switches connected to the server are configured with a same media access control (MAC) address (which may be referred to as a virtual MAC address). A packet sent by the server is sent to any switch according to a hash algorithm. In this case, if the server sends a protocol packet to a switch 1, for example, a border gateway protocol (BGP) packet used to establish a neighbor relationship, and the protocol packet is sent to a switch 2 according to the hash algorithm, because a time to live (TTL) in the protocol packet is 1, and a forwarding chip of the switch usually does not support forwarding a packet whose TTL is 1, the protocol packet cannot be correctly forwarded to the switch 1.

Based on this, in a related technology, the server is configured. Therefore, when sending the protocol packet, the server adjusts the TTL to a value greater than 1, so as to ensure that a subsequent protocol packet can be forwarded to a corresponding switch. However, because a data center network usually includes a large quantity of servers, the servers in the data center network need to be configured one by one in the related technology. Consequently, a configuration process is complex.

SUMMARY

This application provides a packet processing method. A physical MAC address uniquely corresponding to a destination network device is added to a protocol sent to a network device in an M-LAG, and a virtual MAC address is no longer used. Therefore, when receiving a protocol packet including a physical MAC address of another network device in the M-LAG, the network device in the M-LAG performs Layer 2 forwarding of the protocol packet based on the MAC address, and does not check whether a TTL in the protocol packet is greater than 1, so that the protocol packet can be forwarded to the destination network device. According to this solution, no special configuration is required for a server, so that a complicated configuration process is avoided.

A first aspect of this application provides a packet processing method, where the method is applied to a network system, the network system includes a first network device, a second network device, and a third network device, and the third network device is multi-homed to the first network device and the second network device. The third network device may be connected to a gateway interface on the first network device and a gateway interface on the second network device. For example, a networking manner among the first network device, the second network device, and the third network device may be the foregoing M-LAG. The first network device is configured with a first physical MAC address and a virtual MAC address, the second network device is configured with a second physical MAC address and the virtual MAC address, and the virtual MAC address is used to forward a user data packet to a network side. The physical MAC address may alternatively be referred to as a real MAC address.

In addition, the third network device may include the first physical MAC address configured by the first network device, the second physical MAC address configured by the second network device, and the virtual MAC address.

The packet processing method includes: The first network device receives a protocol packet from the third network device, where the protocol packet includes the second physical MAC address; and the first network device forwards the protocol packet to the second network device based on the second physical MAC address. Briefly, when the first network device and the second network device are configured to perform load sharing on the packet sent by the third network device, the protocol packet sent by the third network device is sent to the first network device or the second network device according to a hash algorithm. When the protocol packet and the user data packet are not distinguished, the protocol packet sent by the third network device to the second network device is sent to the first network device according to the hash algorithm in a load sharing mode between the first network device and the second network device. In other words, the first network device receives the protocol packet from the third network device, and a destination party of the protocol packet is the second network device. In the foregoing case, the third network device may add the second physical MAC address to the protocol packet, to indicate that the first network device that receives the protocol packet forwards the protocol packet to the second network device based on the second physical MAC address included in the protocol packet instead of the physical MAC address of the first network device. In addition, when a type of the packet forwarded by the third network device is the user data packet, the user data packet may carry the virtual MAC address of the second network device. After receiving the user data packet, the second network device performs Layer 2 termination on a forwarding plane, and forwards the user data packet to a network side device by using routing information of a control plane.

In some embodiments, the protocol packet received by the first network device from the third network device includes a TTL, and the TTL in the protocol packet forwarded by the first network device to the second network device is not reduced by 1, that is, the TTL in the protocol packet forwarded by the first network device is still 1.

In this application, the protocol packet sent by the third network device carries the physical MAC address of the destination network device, so that a network device other than the destination network device and connected to the third network device can forward the protocol packet to the destination network device based on the physical MAC address, and the TTL is not reduced by 1 in a forwarding process. According to the solution of this application, no special configuration is required for the server, so that a cumbersome configuration process is avoided.

In some embodiments, the method further includes: The first network device receives a request message from the third network device, where the request message includes the first physical internet protocol (IP) address; and the first network device sends a response message to the third network device, where the response message includes the first physical MAC address, and there is a correspondence between the first physical MAC address and the physical IP address of the first network device. In other words, the first physical IP address of the first network device and a second physical IP address of the second network device are configured on the third network device, and the third network device may send the request message to the first network device and the second network device, to obtain a first virtual MAC address that corresponds to the first physical IP address and that is of the first network device, and the second physical MAC address that corresponds to the second physical IP address and that is of the second network device.

In this application, the third network device sends the request message including the physical IP address to the first network device, to obtain the physical MAC address corresponding to the physical IP address, so that the third network device can add the physical MAC address to the protocol packet when subsequently sending the protocol packet to the first network device. In this way, the protocol packets can be forwarded normally and the configuration is not complicated.

In some embodiments, when a network in which the first network device and the third network device are located runs internet protocol version 4 (IPv4), a first request message sent by the third network device may be an address resolution protocol (ARP) request message. When the network in which the first network device and the third network device are located runs internet protocol version 6 (IPv6), a first request message sent by the third network device may be a neighbor discovery (ND) request message. The third network device requests to obtain the physical MAC address by using the ARP request message or the ND request message.

In some embodiments, the first network device forwards the protocol packet to the second network device in a plurality of manners.

In an embodiment, the first network device stores a MAC forwarding entry, and the first network device forwards the protocol packet to the second network device based on the MAC forwarding entry. Specifically, the first network device searches the MAC forwarding entry based on the second physical MAC address in the protocol packet, and obtains a first outbound interface corresponding to the protocol packet, where the first outbound interface is an interface connected to the first network device and the second network device. Then, the first network device forwards the protocol packet to the second network device based on the first outbound interface.

In another embodiment, the first network device forwards the protocol packet to the second network device in a broadcast manner based on the second physical MAC address.

In this application, the first network device forwards the protocol packet to the second network device in a plurality of manners, so that flexibility of the solution can be improved.

In some embodiments, the protocol packet received by the first network device may be a border gateway protocol (BGP) packet, a bidirectional forwarding detection (BFD) protocol packet, an open shortest path first (OSPF) protocol packet, or an intermediate system to intermediate system (IS-IS) protocol packet. In other words, one or more of the foregoing BGP, the BFD protocol, the OSPF protocol, and the IS-IS protocol may run between the first network device and the third network device.

In some embodiments, a next-hop address of a route advertised by the first network device to the third network device is a virtual IP address of the first network device.

In a possible embodiment, when the first network device serves as a route advertiser to advertise the route to the third network device, the first network device generates a target route. For example, when the first network device advertises a route to another network device in the network, the first network device may generate the target route based on the virtual IP address. A next-hop address of the target route is a virtual IP address of the first network device, and a destination address of the target route may be a loopback address of the first network device.

In another possible embodiment, the first network device obtains a first route from a neighboring device, where the first route includes a next-hop address. The first network device updates the next-hop address in the first route to a virtual IP address of the first network device, to obtain a second route. The first network device sends the second route to the third network device.

In some embodiments, the method further includes: The first network device receives a user data packet from the third network device; the first network device searches a routing entry based on the virtual MAC address included in the user data packet, to obtain a second outbound interface; and the first network device forwards the user data packet through the second outbound interface.

In some embodiments, that the first network device searches a routing entry based on the virtual MAC address included in the user data packet, to obtain a second outbound interface includes: The first network device terminates the user data packet on a forwarding plane based on the virtual MAC address included in the user data packet. The first network device searches the routing entry of the control plane to obtain the second outbound interface, and forwards the user data packet through the second outbound interface. Specifically, that the first network device terminates the user data packet on the forwarding plane means that the first network device removes an Ethernet packet header from the user data packet, and sends the user data packet to the control plane, so as to implement forwarding of the user data packet. The routing entry on the first network device may be generated when the first network device obtains the foregoing route. For example, after receiving the first route sent by the neighboring device, the first network device may search a routing table based on the next-hop address in the first route (that is, the loopback address of the neighboring device of the first network device), to obtain an outbound interface (that is, the foregoing second outbound interface) corresponding to the first route. Then, the first network device generates a routing entry based on the destination address of the first route (that is, the destination address of the user) and the second outbound interface, where the routing entry includes the destination address of the user and the second outbound interface.

A second aspect of this application provides a packet processing method, where the method is applied to a network system, the network system includes a first network device, a second network device, and a third network device, and the third network device is multi-homed to the first network device and the second network device. The packet processing method includes: The third network device sends a request message, where the request message includes a physical IP address of the first network device; the third network device receives a response message, where the response message includes a physical MAC address of the first network device, and there is a correspondence between the physical IP address of the first network device and the physical MAC address of the first network device; and the third network device sends a protocol packet, where the protocol packet includes the physical MAC address, and the physical MAC address is used to instruct that the first network device forwards the protocol packet to the second network device.

In some embodiments, the method further includes: The third network device receives a route sent by the first network device, where the route includes a destination address of a user and a next-hop address, and the next-hop address is a virtual IP address of the first network device.

In some embodiments, the method further includes: The third network device generates a user data packet, where the user data packet includes the destination address of the user; the third network device searches a routing entry based on the destination address of the user, to determine that a next-hop address of the user data packet is the virtual IP address of the first network device; the third network device obtains a virtual MAC address corresponding to the virtual IP address of the first network device; and the third network device updates the user data packet based on the virtual MAC address, to obtain an updated user data packet, where the updated user data packet includes the virtual MAC address.

In some embodiments, the request message is an address resolution protocol ARP request message or a neighbor discovery message.

In some embodiments, the protocol packet includes a BGP packet, a BFD protocol packet, an OSPF protocol packet, or an IS-IS protocol packet.

A third aspect of this application provides a network device, where the network device is a first network device in a network system. The network system includes the first network device, a second network device, and a third network device, and the third network device is multi-homed to the first network device and the second network device. The network device includes a transceiver unit, an obtaining unit, and a processing unit, where the transceiver unit is configured to receive a protocol packet from the third network device, the protocol packet includes the second physical MAC address, and the transceiver unit is further configured to forward the protocol packet to the second network device based on the second physical MAC address.

In some embodiments, the transceiver unit is further configured to receive a request message from the third network device, where the request message includes the first physical internet protocol (IP) address; and the transceiver unit is further configured to send a response message to the third network device, where the response message includes the first physical MAC address, and there is a correspondence between the first physical MAC address and a physical IP address of the first network device.

In some embodiments, the request message is an address resolution protocol ARP request message or a neighbor discovery message.

In some embodiments, the protocol packet received by the network device from the third network device includes a time to live TTL, and the TTL in the protocol packet forwarded by the network device to the second network device is not reduced by 1.

In some embodiments, the processing unit is configured to search a MAC forwarding entry based on the second physical MAC address, to obtain a first outbound interface corresponding to the protocol packet; and the transceiver unit is further configured to forward, by the first network device, the protocol packet to the second network device through the first outbound interface.

In some embodiments, the transceiver unit is further configured to forward the protocol packet to the second network device in a broadcast manner based on the second physical MAC address.

In some embodiments, the protocol packet includes a BGP packet, a BFD protocol packet, an OSPF protocol packet, or an IS-IS protocol packet.

In some embodiments, the obtaining unit is configured to obtain a first route, where the first route includes a next-hop address; the processing unit is further configured to update the next-hop address in the first route to a virtual IP address of the first network device, to obtain a second route; and the transceiver unit is further configured to send the second route to the third network device.

In some embodiments, the transceiver unit is further configured to receive a user data packet from the third network device, the processing unit is further configured to search a routing entry based on the virtual MAC address included in the user data packet, to obtain a second outbound interface, and the transceiver unit is further configured to forward the user data packet through the second outbound interface.

In some embodiments, the processing unit is further configured to terminate the user data packet on a forwarding plane based on the virtual MAC address included in the user data packet. The processing unit is further configured to search the routing entry of the control plane to obtain the second outbound interface, and the transceiver unit forwards the user data packet through the second outbound interface.

A fourth aspect of this application provides a network device, where the network device is a third network device in a network system. The network system includes the first network device, a second network device, and a third network device, and the third network device is multi-homed to the first network device and the second network device. The network device includes a transceiver unit, an obtaining unit, and a processing unit. The transceiver unit is configured to send a request message, where the request message includes a physical IP address of the first network device. The transceiver unit is further configured to receive a response message, where the response message includes a physical MAC address of the first network device, and there is a correspondence between the physical IP address of the first network device and the physical MAC address of the first network device. The transceiver unit is further configured to send a protocol packet, where the protocol packet includes the physical MAC address, and the physical MAC address is used to indicate that the first network device forwards the protocol packet to the second network device.

In some embodiments, the transceiver unit is further configured to receive a route sent by the first network device, where the route includes a destination address of a user and a next-hop address, and the next-hop address is a virtual IP address of the first network device.

In some embodiments, the processing unit is configured to generate a user data packet, where the user data packet includes a destination address of a user; and the processing unit is further configured to search a routing entry based on the destination address of the user, and determine that a next-hop address of the user data packet is a virtual IP address of the first network device. The obtaining unit is configured to obtain a virtual MAC address corresponding to the virtual IP address of the first network device. The processing unit is further configured to update the user data packet based on the virtual MAC address, to obtain an updated user data packet, where the updated user data packet includes the virtual MAC address.

In some embodiments, the request message is an address resolution protocol ARP request message or a neighbor discovery message.

In some embodiments, the protocol packet includes a BGP packet, a BFD protocol packet, an OSPF protocol packet, or an IS-IS protocol packet.

A fifth aspect of this application provides a network device. The network device includes a processor, configured to enable the network device to implement the method described in any prior embodiment. The device may further include a memory. The memory is coupled to the processor. When the processor executes instructions stored in the memory, the network device is enabled to implement the method described in any prior embodiment. The device may further include a communications interface. The communications interface is used by the apparatus to communicate with another device. For example, the communications interface may be a transceiver, a circuit, a bus, a module, or a communications interface of another type.

The instructions in the memory in this application may be pre-stored, or may be downloaded from the internet and then stored when the network device is used. Sources of the instructions in the memory are not specifically limited in this application. The coupling in this application is an indirect coupling or a connection between apparatuses, units, or modules, may be in an electrical form, a mechanical form, or another form, and is used for information exchange between the apparatuses, the units, or the modules.

A sixth aspect of this application provides a computer storage medium. The computer storage medium may be non-volatile. The computer storage medium stores computer-readable instructions. When the computer-readable instructions are executed by a processor, the method described in any prior embodiment.

A seventh aspect of this application provides a computer program product including instructions. When the computer program product runs on a computer, the computer is enabled to perform the method described in any prior embodiment.

An eighth aspect of this application provides a network system. The network system includes the network device in any implementation of the first aspect and a plurality of network devices connected to the network device in any prior embodiment.

The solutions provided in the second aspect to the sixth aspect are used to implement or cooperate to implement the method provided in the first aspect, and therefore, can achieve beneficial effects the same as or corresponding to those in the first aspect. Details are not described herein again.

BRIEF DESCRIPTION OF DRAWINGS

FIG. 3b is a schematic diagram of a format of an IP packet header according to an embodiment of this application;

FIG. 3c is a schematic diagram of a format of an Ethernet packet header according to an embodiment of this application;

DETAILED DESCRIPTION

Figure 1:
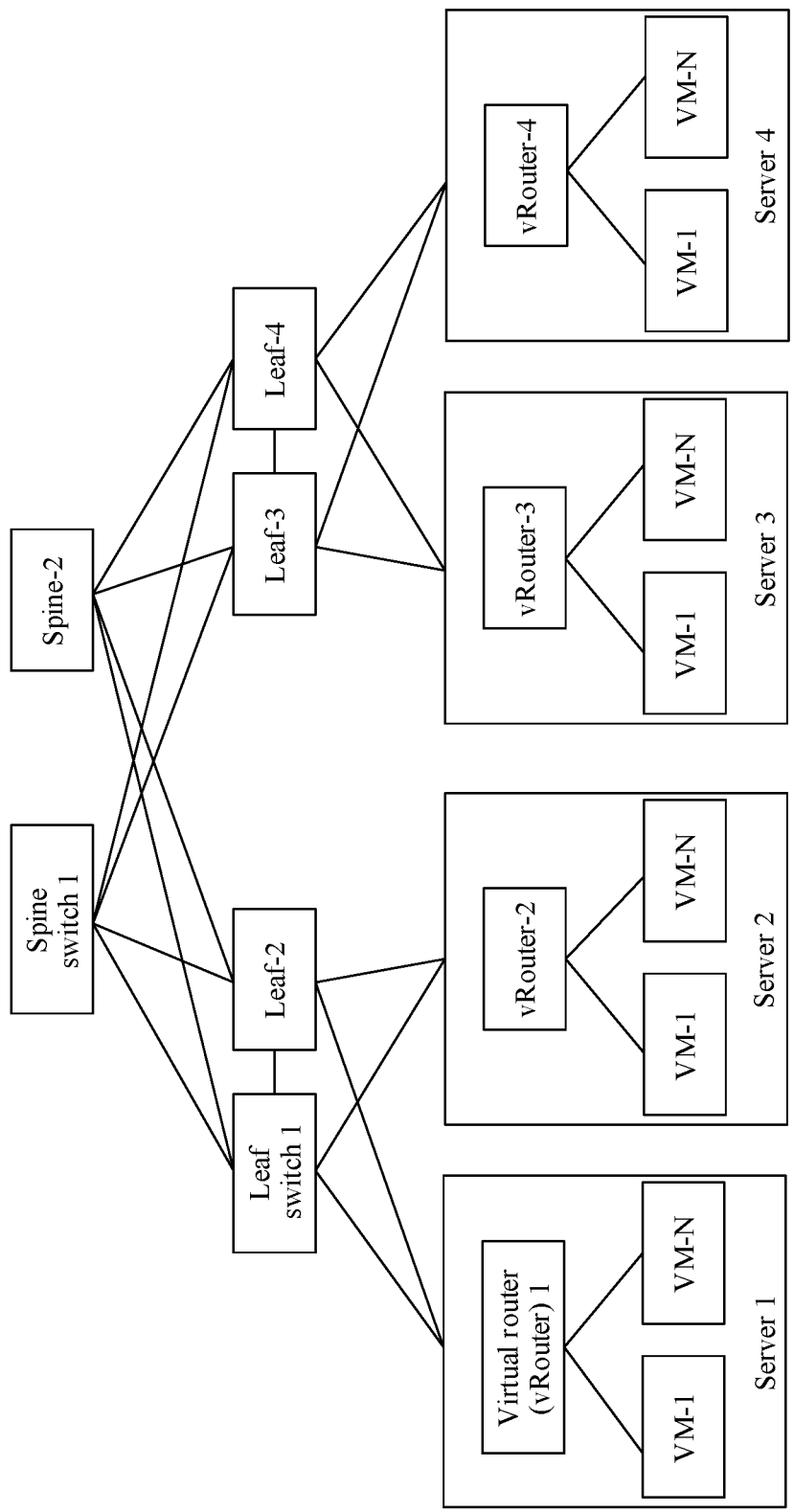
FIG. 1 is a schematic diagram of M-LAG networking in a data center network.

To make objectives, technical solutions, and advantages of this application clearer, the following describes embodiments of this application with reference to accompanying drawings. It is clear that the described embodiments are merely some but not all of the embodiments of this application. A person of ordinary skill in the art may learn that, as a new application scenario emerges, the technical solutions provided in the embodiments of this application are also applicable to a similar technical problem.

In the specification, claims, and accompanying drawings of this application, terms such as "first" and "second" are intended to distinguish between similar objects, but do not necessarily indicate a specific order or sequence. It should be understood that the data used in such a way are interchangeable in proper circumstances so that the embodiments described herein can be implemented in other orders than the order illustrated or described herein. In addition, terms "include" and "have" and any variations thereof are intended to cover non-exclusive inclusions, for example, a process, method, system, product, or device including a series of operations or modules need not be limited to those clearly listed operations or modules, but may include other operations or modules that are not clearly listed or are inherent to these processes, methods, products, or devices. Naming or numbering of operations in this application does not mean that the operations in the method procedures need to be performed in a time/logical order indicated by the naming or numbering. An execution order of the operations in the procedures that have been named or numbered can be changed based on a technical objective to be achieved, as long as same or similar technical effects can be achieved. Division into units in this application is logical division and may be other division in an actual implementation. For example, a plurality of units may be combined or integrated into another system, or some features may be ignored or not performed. In addition, the displayed or discussed mutual couplings or direct couplings or communication connections may be implemented through some interfaces. The indirect couplings or communication connections between the units may be implemented in electronic or other similar forms.

This is not limited in this application. In addition, units or subunits described as separate parts may or may not be physically separate, may or may not be physical units, or may be distributed into a plurality of circuit units. Some or all of the units may be selected based on actual requirements to achieve the objectives of the solutions of this application.

In a data center network, a server may be dual-homed to two switches in active-active access mode. The two switches implement load balancing for the server. This networking mode is referred to as multi-chassis link aggregation group (M-LAG) or MC-LAG. A basic idea of an M-LAG technology is to allow two switches to perform link aggregation negotiation with an accessed device in a same status. From a perspective of the accessed device, this is similar to establishing a link aggregation relationship with a device. This mechanism for implementing multi-chassis link aggregation can implement link aggregation between a plurality of devices. The M-LAG functions as a logical link aggregation group. Entries on the M-LAG peer devices (that is, the two switches) need to be consistent. Therefore, entries may be synchronized at both ends of the M-LAG through a peer link between the peer devices. Briefly, the M-LAG is a networking mode that implements link aggregation among a plurality of devices, so that link reliability is improved.

FIG. 1 is a schematic diagram of M-LAG networking in a data center network. As shown in FIG. 1, for a server 1 to a server 4, any server is dual-homed to two leaf switches. For example, the server 1 is dual-homed to a leaf switch 1 and a leaf switch 2, and the leaf switch 1 and the leaf switch 2 implement load balancing for a data packet sent from the server 1 to the outside.

In M-LAG networking mode, the two leaf switches connected to the server 1 are configured with a same media access control (MAC) address (which may be referred to as a virtual MAC address). A packet sent by the server is sent to any switch according to a hash algorithm. In this case, if the server sends a protocol packet to the leaf switch 1, for example, if the server sends a border gateway protocol (BGP) association establishment packet to the leaf switch 1, and the protocol packet is sent to the leaf switch 2 according to the hash algorithm, because the server 1 is directly connected to the leaf switch 1, a time to live (TTL) in the protocol packet sent by the server 1 is 1. However, because a forwarding chip of a switch generally does not support forwarding a packet whose TTL is 1, the protocol packet cannot be correctly forwarded to the leaf switch 1.

Based on this, in a related technology, the server is configured, so that when sending the protocol packet, the server can adjust the TTL to a value greater than 1, so as to ensure that a subsequent protocol packet can be forwarded to a corresponding switch. However, because a data center network usually includes a large quantity of servers, the servers in the data center network may be configured one by one in a related technology, and a configuration process is complex.

In view of this, an embodiment of this application provides a packet processing method. A physical MAC address uniquely corresponding to a destination network device is added to a protocol sent to a network device in an M-LAG. Therefore, when receiving a protocol packet including a physical MAC address of another network device in the M-LAG, the network device in the M-LAG performs Layer 2 forwarding of the protocol packet based on the MAC address, and does not check whether a TTL in the protocol packet is greater than 1, so that the protocol packet can be forwarded to the destination network device. According to this solution, no special configuration is required for a server, so that a complicated configuration process is avoided.

The foregoing uses an M-LAG networking scenario as an example to describe a scenario to which the packet processing method provided in the embodiments of this application is applied. It may be understood that the packet processing method provided in the embodiments of this application may also be applied to another service scenario with dual-homing access or multi-homing access. A service scenario to which the embodiments of this application are applied is not uniquely limited herein.

Figure 2:
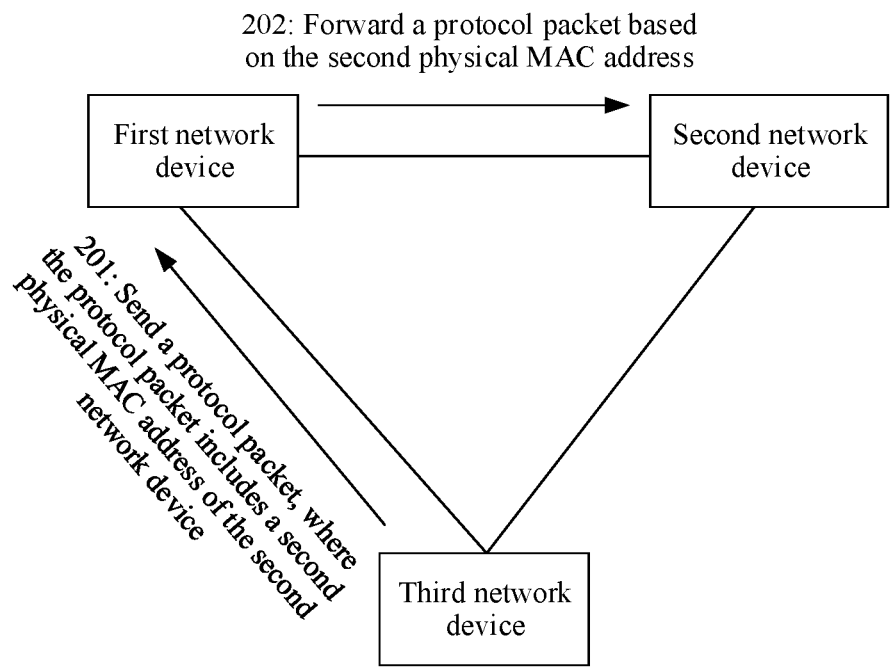
FIG. 2 is a schematic flowchart of a packet processing method according to an embodiment of this application.

FIG. 2 is a schematic flowchart of a packet processing method according to an embodiment of this application. The packet processing method provided in this embodiment of this application is applied to a network system. The network system includes a first network device, a second network device, and a third network device. The third network device is multi-homed to the first network device and the second network device. The third network device may be connected to a gateway interface on the first network device and a gateway interface on the second network device. For example, a networking manner among the first network device, the second network device, and the third network device may be the foregoing M-LAG.

The first network device is configured with a first physical MAC address and a virtual MAC address, the second network device is configured with a second physical MAC address and the virtual MAC address, and the virtual MAC address is used to forward a user data packet to a network side. In other words, the first network device and the second network device are configured with different physical MAC addresses, the first network device and the second network device are configured with the same virtual MAC address, and the virtual MAC address is used by the first network device and the second network device to forward the user data packet to the network side.

The first physical MAC address configured by the first network device may be a MAC address of the gateway interface that is on the first network device and that is connected to the third network device, and the first physical MAC address can be used to uniquely identify the gateway interface that is on the first network device and that is connected to the third network device. Similarly, the second physical MAC address configured by the second network device may be a MAC address of the gateway interface that is on the network device of the second network and that is connected to the third network device, and the second physical MAC address can be used to uniquely identify the gateway interface that is on the second network device and that is connected to the third network device. As the unique identifier of the gateway interface in the network device, the first physical MAC address and the second physical MAC address may be separately configured on the first network device and the second network device before the first network device and the second network device are delivered from factory. The foregoing uses an example in which the first physical MAC address and the second physical MAC address are addresses of the gateway interfaces. In another possible application scenario, the first physical MAC address and the second physical MAC may alternatively be addresses of other objects.

In addition, the virtual MAC address may be configured on the first network device and the second network device in a plurality of manners. For example, a network administrator may statically configure the same virtual MAC address on the first network device and the second network device in a manual configuration manner. For another example, a controller may dynamically allocate the virtual MAC address to a network device in the network system. After allocating the same virtual MAC address to the first network device and the second network device, the controller delivers the allocated virtual MAC address to the first network device and the second network device. In this way, the virtual MAC address is configured on the first network device and the second network device. For another example, the first network device dynamically allocates the virtual MAC address, and sends the allocated virtual MAC address to the second network device, so that the first network device and the second network device configure the same virtual MAC address.

In this embodiment, that the third network device is multi-homed to the first network device and the second network device may include: The third network device is dual-homed to the first network device and the second network device, or the third network device is multi-homed to the first network device, the second network device, and another network device. For example, the third network device is triple-homed to the first network device, the second network device, and a fourth network device. For ease of description, an example in which the third network device is dual-homed to the first network device and the second network device is used below to describe the packet processing method provided in this embodiment of this application.

In this embodiment, the first network device and the second network device in the network system may be, for example, a physical device such as a router, a switch, or a gateway, or may be a virtual device that supports packet forwarding. Specific types of the first network device and the second network device are not limited in this embodiment. The third network device may be, for example, a server or another user-side device.

As shown in FIG. 2, the packet processing method includes at least the following operations 201 and 202.

Operation 201: The first network device receives a protocol packet from the third network device, where the protocol packet includes the second physical MAC address.

Because the third network device is multi-homed to the first network device and the second network device, when the first network device and the second network device are configured to perform load sharing on the packet sent by the third network device, the protocol packet sent by the third network device is sent to the first network device or the second network device according to a hash algorithm. In this embodiment, the protocol packet sent by the third network device to the second network device is sent to the first network device according to a hash algorithm. In other words, the first network device receives the protocol packet from the third network device, and a destination party of the protocol packet is the second network device.

The third network device may store the second physical MAC address (namely, a physical MAC address of the second network device) and a second physical IP address (namely, a physical IP address of the second network device), and a correspondence between the second physical MAC address and the second physical IP address is established on the third network device. The third network device can find the corresponding second physical MAC address based on the second physical IP address. In this way, when the third network device sends the protocol packet to the second network device, the third network device may find the corresponding second physical MAC address based on the second physical IP address of the second network device, and add the second physical MAC address to the packet.

In some embodiments, the third network device may obtain the second physical MAC address and the second physical IP address in a plurality of manners. For example, the network administrator may statically configure, on the third network device in the manual configuration manner, the second physical MAC address and the second physical IP address that correspond to the second network device. Alternatively, the controller delivers the second physical MAC address and the second physical IP address to the third network device, so that the second physical MAC address and the second physical IP address are configured on the third network device. For another example, the third network device obtains the second physical IP address corresponding to the second network device in the manner in which the second physical IP address is manually configured by the network administrator or delivered by the controller, and then the third network device sends a request message to the second network device based on the second physical IP address, to receive a response message that is returned by the second network device and that includes the second physical MAC address. In this way, the second physical MAC address and the second physical IP address are obtained. Similarly, the third network device may obtain the physical IP address (namely, the first physical IP address) and the physical MAC address (namely, the first physical MAC address) of the first network device in the foregoing manner. Details are not described herein again.

In some embodiments, the protocol packet received by the first network device may be a border gateway protocol (BGP) packet, a bidirectional forwarding detection (BFD) protocol packet, an open shortest path first (OSPF) protocol packet, or an intermediate system to intermediate system (IS-IS) protocol packet. In other words, one or more of the foregoing BGP, the BFD protocol, the OSPF protocol, and the IS-IS protocol may run between the first network device and the third network device. For example, the BGP runs between the first network device and the third network device, or both the BGP and the BFD protocol run between the first network device and the third network device. The BFD protocol is used to improve a route convergence speed when a link fails. For example, when the BGP runs between the first network device and the third network device, the protocol packet received by the first network device may be a packet for requesting to establish a BGP connection. In other words, the protocol packet is a packet used by the third network device to request to establish the BGP connection to the second network device.

Operation 202: The first network device forwards the protocol packet to the second network device based on the second physical MAC address.

In this embodiment, after the first network device receives the protocol packet, because the second physical MAC address included in the protocol packet is not the physical MAC address corresponding to the first network device, the first network device forwards the protocol packet to the second network device.

The first network device forwards the protocol packet to the second network device in a plurality of manners.

In a possible embodiment, the first network device stores a MAC forwarding entry, and the first network device forwards the protocol packet to the second network device based on the MAC forwarding entry. Specifically, the first network device searches the MAC forwarding entry based on the second physical MAC address in the protocol packet, and obtains a first outbound interface corresponding to the protocol packet, where the first outbound interface is an interface connected to the first network device and the second network device. Then, the first network device forwards the protocol packet to the second network device based on the first outbound interface.

In some embodiments, a peer link may be established between the first network device and the second network device. The peer link may be a physical link or a logical link simulated through a tunnel, and is used to implement packet communication between the first network device and the second network device. The first network device may send the protocol packet to the second network device by using the peer link.

The MAC forwarding entry on the first network device may be manually configured by the network administrator on the first network device. Alternatively, the MAC forwarding entry may be delivered by the controller to the first network device. The MAC forwarding entry may alternatively be generated by the first network device after the first network device receives the second physical MAC address sent by the second network device.

In another possible embodiment, the first network device forwards the protocol packet to the second network device in a broadcast manner based on the second physical MAC address. Briefly, the first network device may forward, based on the second physical MAC address, the protocol packet to another network device that implements load sharing with the first network device. For example, when the third network device is triple-homed to the first network device, the second network device, and the fourth network device, a peer link is established between the first network device and the second network device, and a peer link is also established between the first network device and the fourth network device. The first network device may broadcast the protocol packet to the second network device and the fourth network device by using the peer link between the first network device and the second network device and the peer link between the first network device and the fourth network device.

In a possible case, the protocol packet received by the first network device from the third network device includes a TTL, and the TTL is 1. The TTL in the protocol packet forwarded by the first network device to the second network device is not reduced by 1. In other words, the TTL in the protocol packet forwarded by the first network device is still 1.

Figure 3A:
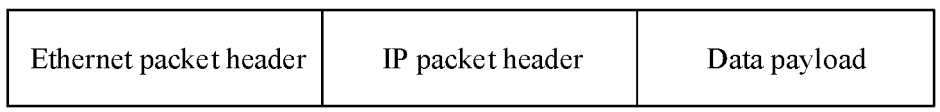
FIG. 3a is a schematic diagram of a format of a protocol packet according to an embodiment of this application.

It may be understood that, in a data communication process, a device that initiates a packet may separately encapsulate a packet header based on a data payload according to a followed protocol of each layer. After data arrives at a destination network device, the destination network device removes the corresponding packet header according to the protocol of each layer. FIG. 3a is a schematic diagram of a format of a protocol packet according to an embodiment of this application. As shown in FIG. 3a, the protocol packet sent by the third network device includes a data payload, an IP packet header, and an Ethernet packet header. The data payload includes data content that the third network device requests to establish a connection. FIG. 3b is a schematic diagram of a format of an IP packet header according to an embodiment of this application. As shown in FIG. 3b, the IP packet header includes content such as a time to live (TTL), a source IP address, and a destination IP address, and the TTL in the IP packet is 1. FIG. 3c is a schematic diagram of a format of an Ethernet packet header according to an embodiment of this application. As shown in FIG. 3c, the Ethernet packet header includes content such as a destination address, a source address, and a type. Specifically, the destination address in the Ethernet packet header may be the foregoing second physical MAC address. After the first network device receives the protocol packet, the first network device forwards the protocol packet based on the second physical MAC address in the Ethernet packet header. The first network device does not remove the Ethernet packet header from the protocol packet, that is, the first network device does not perform Layer 2 termination, and the protocol packet is not uploaded to Layer 3 for processing. Therefore, the first network device does not check the TTL in the IP packet header, so that the protocol packet can be forwarded to the second network device. Because the first network device does not perform Layer 2 termination, the first network device does not modify the IP packet header. In other words, the TTL in the IP packet header is not reduced by 1, and the TTL in the protocol packet forwarded by the first network device is still 1.

In some embodiments, when the first network device forwards the protocol packet to the second network device, the first network device may transparently transmit the protocol packet to the second network device. In other words, the first network device does not modify any content in the protocol packet. The first network device may further forward updated protocol packet to the second network device after updating the protocol packet. For example, after modifying information about one or more fields in the packet header of the protocol packet, the first network device forwards modified protocol packet to the second network device. In actual application, the first network device may select, based on a type of the protocol packet, to transparently transmit the protocol packet to the second network device or send the updated protocol packet.

After the second network device receives the protocol packet forwarded by the first network device, the second network device determines that the protocol packet includes the second physical MAC address. Therefore, the second network device performs Layer 2 termination, specifically, for example, removing the Ethernet packet header from the protocol packet, and checking the IP packet header. Because the destination IP address in the IP packet header is the physical IP address of the second network device, and the TTL in the IP packet header is 1, the second network device may perform the response operation to the third network device based on the protocol packet. For example, when the protocol packet is the packet for requesting to establish the BGP connection, the second network device sends a response packet for establishing the BGP connection to the third network device, so as to establish the BGP connection.

In this way, in the embodiment of this application, the protocol packet sent by the third network device carries the physical MAC address of the destination network device, so that a network device other than the destination network device and connected to the third network device can forward the protocol packet to the destination network device based on the physical MAC address, and the TTL is not reduced by 1 in a forwarding process. According to the solution of the embodiment of this application, no special configuration is required for the server, so that a cumbersome configuration process is avoided.

Figure 4:
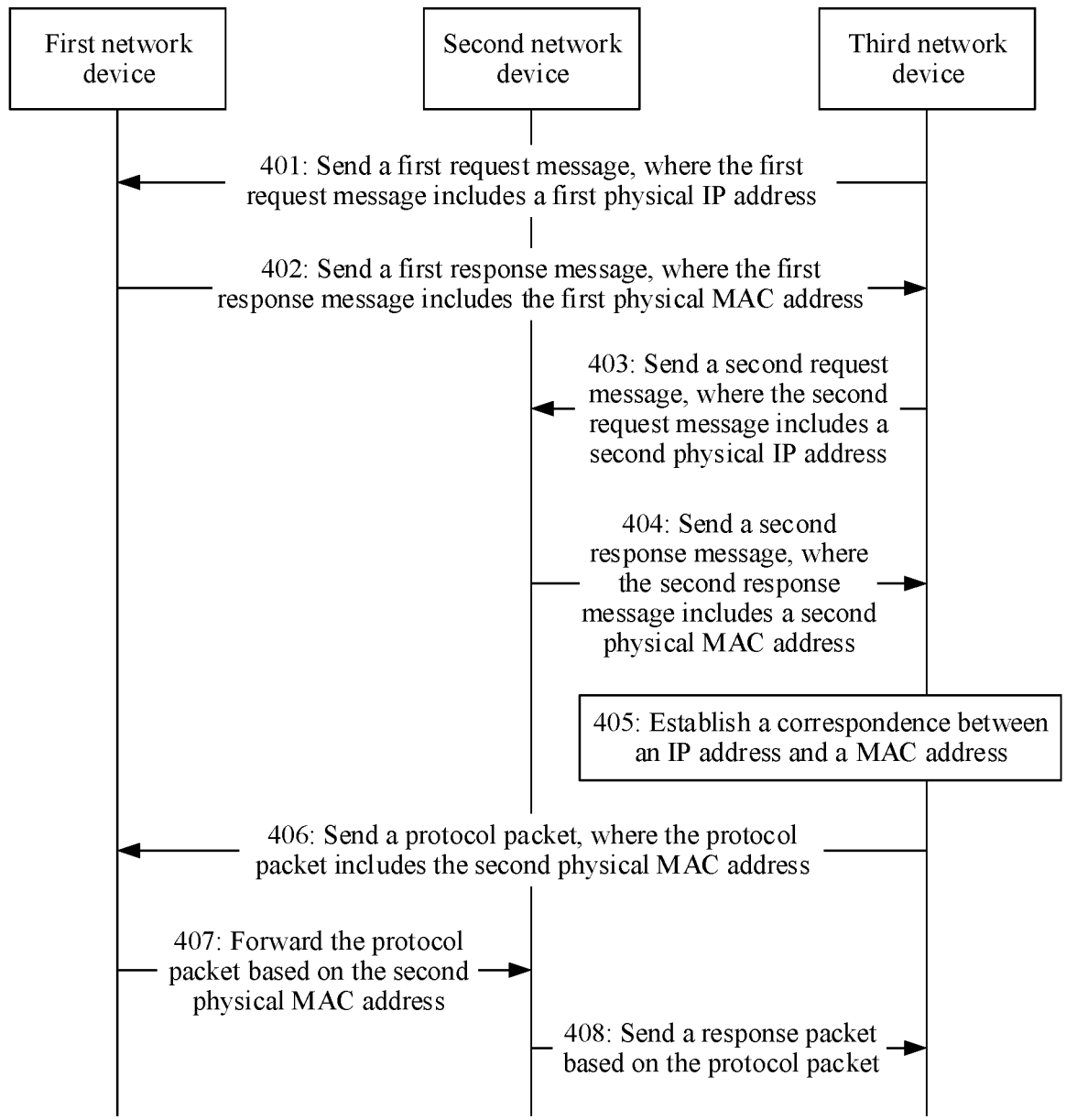
FIG. 4 is a schematic flowchart of a packet processing method according to an embodiment of this application.

FIG. 4 is a schematic flowchart of a packet processing method according to an embodiment of this application. As shown in FIG. 4, the packet processing method includes operations 401 to 408.

Operation 401: A third network device sends a first request message to a first network device, where the first request message includes a first physical IP address.

In this embodiment, the first physical IP address of the first network device and a second physical IP address of a second network device are configured on the third network device, and the third network device may send the request message to the first network device and the second network device, to obtain a first physical MAC address that corresponds to the first physical IP address and that is of the first network device, and a second physical MAC address that corresponds to the second physical IP address and that is of the second network device.

In some embodiments, when a network in which the first network device and the third network device are located runs internet protocol version 4 (IPv4), the first request message sent by the third network device may be an address resolution protocol (ARP) request message. When the network in which the first network device and the third network device are located runs internet protocol version 6 (IPv6), the first request message sent by the third network device may be a neighbor discovery (ND) request message.

Operation 402: The first network device sends a first response message to the third network device, where the first response message includes the first physical MAC address, and there is a correspondence between the first physical MAC address and the physical IP address of the first network device.

Because the correspondence between the first physical MAC address and the first physical IP address is established on the first network device, that is, the first physical MAC address is associated with the first physical IP address, the first network device may, based on the first physical IP address in the first request message, send the first response message including the first physical MAC address to the third network device.

In some embodiments, when the network in which the first network device and the third network device are located runs IPv4, the first response message sent by the first network device may be an ARP response message. When the network in which the first network device and the third network device are located runs IPv6, the first response message sent by the first network device may be an ND response message.

Operation 403: The third network device sends a second request message to the second network device, where the second request message includes the second physical IP address.

Operation 404: The second network device sends a second response message to the third network device, where the second response message includes the second physical MAC address, and there is a correspondence between the second physical MAC address and the physical IP address of the second network device.

In this embodiment, operations 403 and 404 are similar to the foregoing operations 401 and 402. For details, refer to operations 401 and 402. Details are not described herein again.

It should be noted that there is no limitation on a sequence of performing operations 401 and 402 and operations 403 and 404. In other words, operations 401 and 402 may be performed first, or operations 403 and 404 may be performed first, or operations 401, 402, 403, and 404 may be performed simultaneously.

Operation 405: The third network device establishes the correspondence between the first physical IP address and the first physical MAC address based on the first response message, and establishes a correspondence between the second physical IP address and the second physical MAC address based on the second response message.

After the third network device receives the first response message, the third network device may establish the correspondence between the first physical IP address and the first physical MAC address based on the first physical MAC address in the first response message. Similarly, after the third network device receives the second response message, the third network device may establish the correspondence between the second physical IP address and the second physical MAC address based on the second physical MAC address in the second response message.

For example, the third network device may establish an association table (for example, an ARP table). An associated IP address and a MAC address, that is, the foregoing first physical IP address and the first physical MAC address, and the foregoing second physical IP address and the second physical MAC address, are recorded in the association table.

Operation 406: The third network device sends a protocol packet to the first network device, where the protocol packet includes the second physical MAC address.

After the third network obtains the second physical MAC address corresponding to the second physical IP address of the second network device, when the third network device sends a protocol packet to the second network device, the third network device may search the foregoing association table based on the second physical IP address of the second network device, to determine the second physical MAC address. Then, the third network device may encapsulate the second physical IP address and the second physical MAC address into the protocol packet, and send the protocol packet. The protocol packet sent by the third network device is sent to the first network device according to a hash algorithm. In other words, the first network device receives the protocol packet from the third network device, and a destination party of the protocol packet is the second network device.

Operation 407: The first network device forwards the protocol packet to the second network device based on the second physical MAC address.

Operation 408: The second network device sends a response packet to the third network device based on the protocol packet.

In this embodiment, operations 407 and 408 are similar to the foregoing operation 202. For details, refer to the foregoing description of operation 202. Details are not described herein again.

Figure 5:
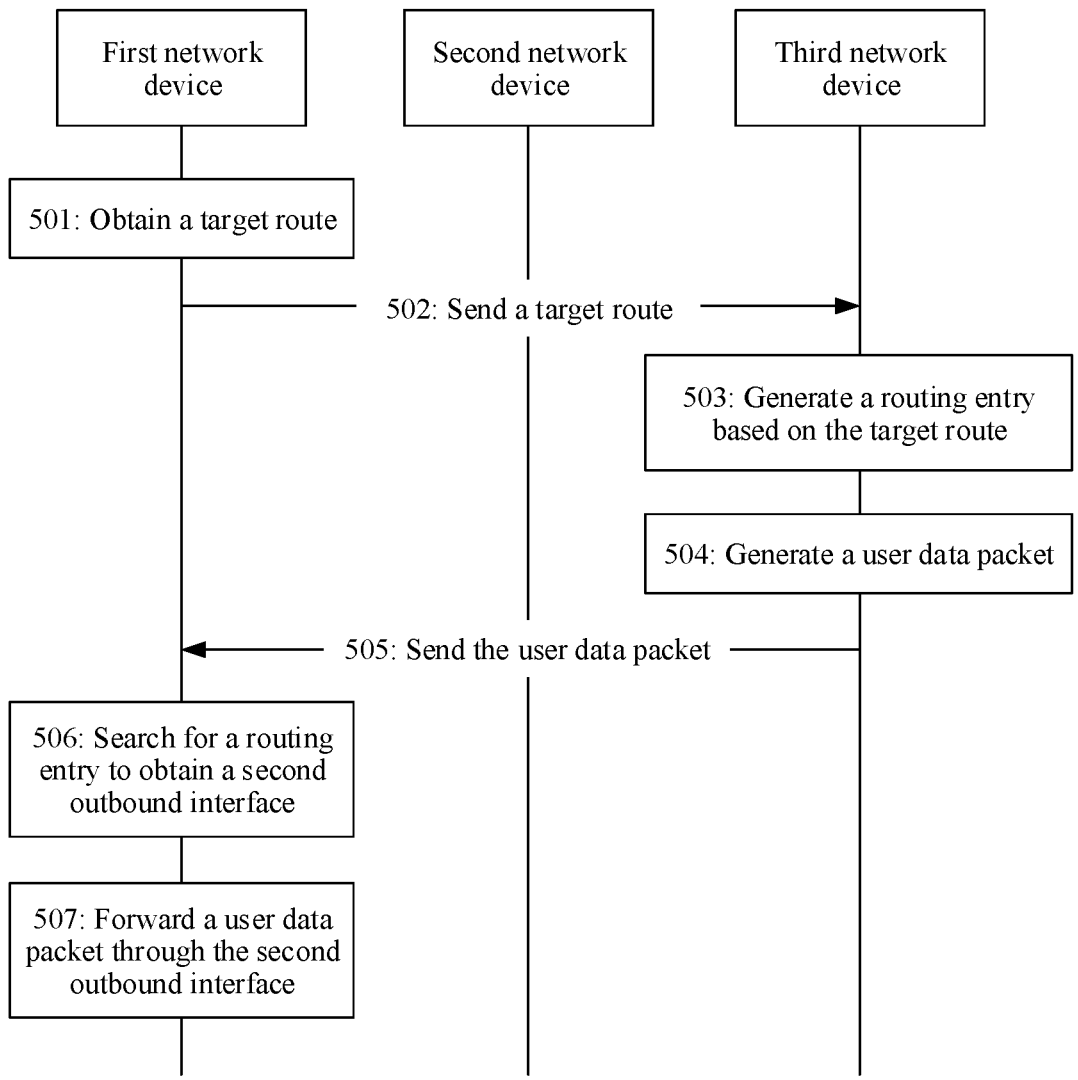
FIG. 5 is a schematic flowchart of a user data packet processing method according to an embodiment of this application.

The foregoing describes a process in which the third network device sends the protocol packet to the second network device. The following describes a process in which the third network device sends a user data packet. After the third network device separately establishes a BGP session with the first network device and the second network device by using the protocol packet, for example, a BGP packet, the first network device and the second network device may be configured to forward the user data packet sent by the third network device. FIG. 5 is a schematic flowchart of a user data packet processing method according to an embodiment of this application. As shown in FIG. 5, the user data packet processing method includes operations 501 to 507.

Operation 501: A first network device obtains a target route, where a next-hop address of the target route is a virtual IP address of the first network device.

In this embodiment, the first network device obtains the target route in a plurality of manners.

In a possible embodiment, the first network device obtains a route from a neighboring device, and obtains the target route by modifying a next-hop address of the route. For example, when another network device in a network advertises a route, the first network device obtains a first route from a neighboring device, where the first route includes a next-hop address, and the next-hop address in the first route is an IP address of the neighboring device of the first network device. After obtaining the first route, the first network device updates the next-hop address in the first route to a virtual IP address of the first network device, to obtain a second route. The virtual IP address may be, for example, a gateway IP address of the first network device. A next-hop address of the second route is the virtual IP address of the first network device, and the virtual IP address of the first network device is the same as a virtual IP address of a second network device. A destination address of the second route may be a loopback address of a route advertiser, and the second route is the foregoing target route.

In another possible embodiment, when the first network device serves as the route advertiser to advertise a route to another network device in the network, the first network device generates the target route. For example, when the first network device advertises a route to another network device in the network, the first network device may generate the target route based on the virtual IP address. A next-hop address of the target route is a virtual IP address of the first network device, and a destination address of the target route may be a loopback address of the first network device.

Operation 502: The first network device sends the target route to a third network device.

After obtaining the target route, the first network device may send the target route to the third network device that is the neighboring device of the first network device, to implement propagation of the target route in the network.

Operation 503: The third network device generates a routing entry based on the target route, where the routing entry includes a destination address of the target route and the virtual IP address of the first network device.

After obtaining the target route, the third network device may generate the routing entry based on the destination address and the next-hop address in the target route, to implement subsequent sending of a user data packet related to the target route. The routing entry generated by the third network device includes the destination address of the target route and the virtual IP address of the first network device.

Operation 504: The third network device generates a user data packet, where the user data packet includes a destination address of the user and the virtual MAC address.

In this embodiment, the third network device may be the foregoing server, and the third network device may perform data interaction with user equipment or another server based on a service requirement. Specifically, when the third network device determines that the user data packet may be sent to a destination network device, the third network device generates the user data packet, where the user data packet includes a destination address corresponding to the destination network device, that is, the foregoing destination address of the user. The destination address of the user may be located in an IP packet header of the user data packet. Then, the third network device searches the routing entry on the third network device based on the destination address of the user, and determines that a next-hop address of the user data packet is the virtual IP address of the first network device. Because the third network device stores a correspondence between the virtual IP address of the first network device and the virtual MAC address of the first network device, the third network device may obtain the virtual MAC address corresponding to the virtual IP address of the first network device. Finally, the third network device updates the user data packet based on the virtual MAC address, to obtain an updated user data packet, where the updated user data packet includes the destination address of the user and the virtual MAC address, and the virtual MAC address may be located in an Ethernet packet header of the updated user data packet.

It should be noted that the third network device stores the correspondence between the virtual IP address of the first network device and the virtual MAC address of the first network device. The correspondence between the virtual IP address of the first network device and the virtual MAC address of the first network device may be statically configured on the third network device, or may be generated by the third network device based on the obtained virtual IP address and the obtained virtual MAC address. Specifically, a manner in which the third network device obtains the virtual IP address and the virtual MAC address is similar to the foregoing operations 401 to 404. For details, refer to the foregoing operations 401 to 404. Details are not described herein again.

Operation 505: The third network device sends the user data packet to the first network device.

After generating the user data packet including the destination address of the user and the virtual MAC address, the third network device sends the user data packet to the first network device, so that the first network device further forwards the user data packet. In this way, the user data packet is forwarded to the destination network device.

In this embodiment, the first network device and the second network device may be configured to perform load sharing on packets sent by the third network device, and the user data packet sent by the third network device may be sent to the first network device or the second network device according to a hash algorithm. Because the first network device and the second network device include the same virtual MAC address and the same virtual IP address, both the first network device and the second network device can forward the user data packet sent by the third network device. For ease of description, the following describes a forwarding process of the user data packet by using an example in which the user data packet sent by the third network device is sent to the first network device according to the hash algorithm.

Operation 506: The first network device searches a routing entry based on the virtual MAC address included in the user data packet to obtain a second outbound interface.

In this embodiment, after the first network device receives the user data packet, the first network device terminates the user data packet on a forwarding plane based on the virtual MAC address included in the user data packet, that is, based on the fact that the virtual MAC address in the user data packet is the same as the virtual MAC address of the first network device. Specifically, that the first network device terminates the user data packet on the forwarding plane means that the first network device removes an Ethernet packet header from the user data packet, and sends the user data packet to the control plane, so as to implement forwarding of the user data packet. After the first network device removes the Ethernet packet header from the user data packet, the first network device searches the routing entry of the control plane based on the destination address of the user included in the user data packet, to obtain the second outbound interface, and forwards the user data packet through the second outbound interface.

Specifically, the routing entry on the first network device may be generated when the first network device obtains the foregoing target route. For example, after receiving the first route sent by the neighboring device, the first network device may search a routing table based on the next-hop address in the first route (for example, the loopback address of the neighboring device of the first network device), to obtain an outbound interface (that is, the foregoing second outbound interface) corresponding to the first route. Then, the first network device generates a routing entry based on the destination address of the first route (that is, the destination address of the user) and the second outbound interface, where the routing entry includes the destination address of the user and the second outbound interface.

Operation 507: The first network device forwards the user data packet through the second outbound interface.

After finding the second outbound interface, the first network device forwards the user data packet through the second outbound interface, so as to forward the user data packet to a network-side neighboring device of the first network device, and the network-side neighboring device of the first network device performs next-step forwarding of the user data packet. Finally, the user data packet is forwarded to the destination network device.

The foregoing describes a process in which the first network device performs route advertisement and user data packet forwarding. For ease of understanding, the following describes a process of route advertisement and user data packet forwarding with reference to a specific scenario.

Figure 6A:
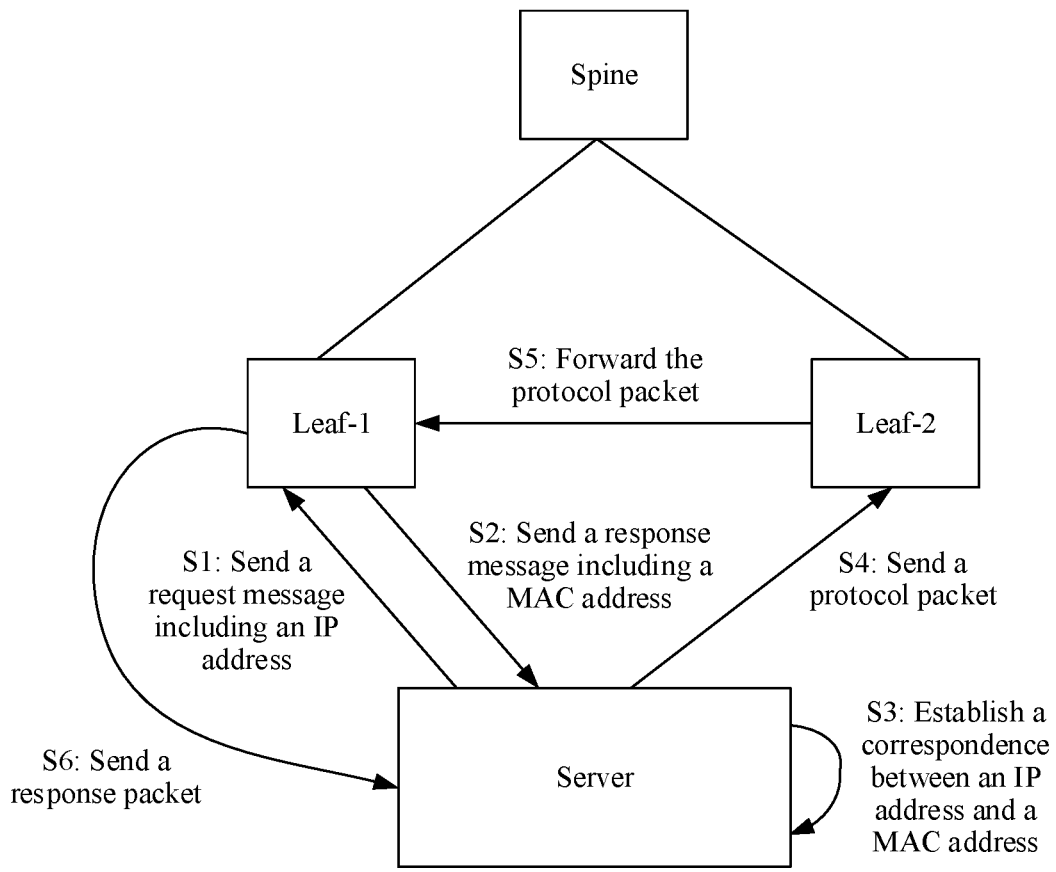
FIG. 6a is a schematic flowchart of establishing a protocol connection between a server and a leaf switch according to an embodiment of this application.

FIG. 6a is a schematic flowchart of establishing a protocol connection between a server and a leaf switch according to an embodiment of this application. As shown in FIG. 6a, a process in which the server establishes the protocol connection to the leaf switch includes operations S1 to S6.

S1: The server sends a request message to a leaf switch 1.

A physical IP address of the leaf switch 1 is configured in the server, and the server may send the request message to the leaf switch 1, to obtain a physical MAC address corresponding to the physical IP address on the leaf switch 1.

Specifically, the physical IP address of the leaf switch 1 that is configured in the server is, for example, 2.1.1.4, and the request message sent by the server to the leaf switch 1 carries the physical IP address 2.1.1.4. The request message may be an ARP request message or an ND request message.

S2: The leaf switch 1 sends a response message to the server.

After the leaf switch 1 receives the request message sent by the server, the leaf switch 1 determines that a MAC address included in the request message is the physical MAC address of the leaf switch 1. Therefore, the leaf switch 1 sends the response message to the server based on the physical MAC address corresponding to the physical MAC address, where the response message includes the physical MAC address of the leaf switch 1. For example, the physical MAC address included in the response message may be acb3-b586-a370.

It may be understood that a physical IP address of a leaf switch 2 may be further configured in the server, and the server sends a request message to the leaf switch 2, to obtain a physical MAC address of the leaf switch 2. For example, the physical IP address of the leaf switch 2 that is configured in the server is 2.1.1.5, and the server receives a response message returned by the leaf switch 2, to obtain the physical MAC address of the leaf switch 2 as acb3-b586-a371.

S3: The server establishes a correspondence between an IP address and a MAC address.

After the server receives the response message sent by the leaf switch 1, the server may establish a correspondence between the physical IP address 2.1.1.4 and the physical MAC address acb3-b586-a370 based on the physical MAC address in the response message.

S4: The server sends a protocol packet to the leaf switch 2.

When the server sends the protocol packet to the leaf switch 1, the server may search an association table based on the physical IP address of the leaf switch 1, to determine the MAC address of the leaf switch 1. Then, the server may encapsulate the physical IP address 2.1.1.4 and the physical MAC address acb3-b586-a370 of the leaf switch 1 into the protocol packet, and send the protocol packet. The protocol packet sent by the server is sent to the leaf switch 2 according to a hash algorithm. In other words, the leaf switch 2 receives the protocol packet from the server, and a destination party of the protocol packet is the leaf switch 1.

For example, the protocol packet sent by the server to the leaf switch 2 is, for example, a BGP association establishment packet, used to request to establish a BGP connection to the leaf switch 2.

S5: The leaf switch 2 forwards the protocol packet to the leaf switch 1.

After the leaf switch 2 receives the protocol packet sent by the server, the leaf switch 2 may determine that the MAC address in the protocol packet is not the physical MAC address of the leaf switch 2. Therefore, the leaf switch 2 forwards the protocol packet to the leaf switch 1 based on the physical MAC address acb3-b586-a370 in the protocol packet.

S6: The leaf switch 1 sends a response packet to the server.

After the leaf switch 1 receives the protocol packet forwarded by the leaf switch 2, because the protocol packet includes the physical MAC address and the physical IP address of the leaf switch 1, the leaf switch 1 may determine that the destination party of the protocol packet is the leaf switch 1, and send the response packet to the server.

For example, when the protocol packet is a packet for requesting to establish the BGP connection, the leaf switch 1 sends a response packet for establishing the BGP connection to the server, so as to establish the BGP connection.

It may be understood that the server may send the protocol packet to the leaf switch 2 in a similar manner, to establish the BGP connection to the leaf switch 2. For details, refer to the foregoing operations S1 to S6. Details are not described herein again.

Figure 6B:
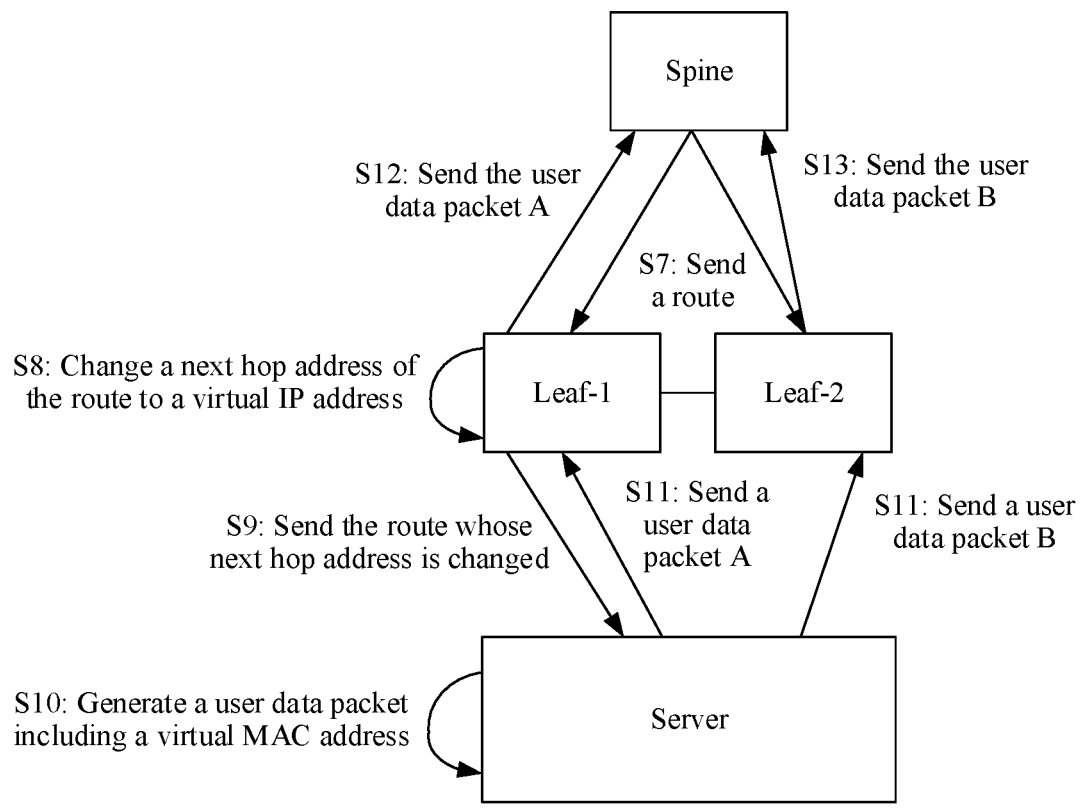
FIG. 6b is a schematic flowchart of route advertisement and user data packet forwarding according to an embodiment of this application.

FIG. 6b is a schematic flowchart of route advertisement and user data packet forwarding according to an embodiment of this application. As shown in FIG. 6b, a process of route advertisement and user data packet forwarding includes operations S7 to S13.

S7: The spine switch sends a route to the leaf switch 1 and the leaf switch 2.

In this embodiment, after the spine switch obtains, from another leaf switch, a route advertised by a route advertiser, and the spine switch modifies a next hop address of the obtained route to an interface address of the spine switch, the spine switch separately sends the route whose next-hop address is changed to the leaf switch 1 and the leaf switch 2. For example, it is assumed that a destination address of the route obtained by the spine switch is 1.1.1.1, a next-hop address of the route sent by the spine switch to the leaf switch 1 is 192.168.1.1 (namely, an address of an interface connecting the spine switch to leaf switch 1), and a next-hop address of the route sent by the spine switch to the leaf switch 2 is 192.168.1.2 (namely, an address of an interface connecting the spine switch to the leaf switch 2).

S8: The leaf switch 1 generates a routing entry based on the received route, and changes the next-hop address of the route to a virtual IP address.

Based on the route received from the spine switch, the leaf switch 1 searches a routing table to obtain an outbound interface (if the outbound interface is an interface 1) corresponding to the next-hop address of the route. Then, the leaf switch 1 generates a routing entry based on the received route, where the routing entry includes the destination address (1.1.1.1), the next-hop address (192.168.1.1), and an outbound interface (an interface 2). In addition, the leaf switch 1 further modifies the next-hop address of the received route to the virtual IP address of the leaf switch 1, so as to send, to the server, the route whose next-hop address is changed. For example, the next-hop address of the route received by the leaf switch 1 is changed to 2.1.1.1.

Similarly, after receiving the route sent by the spine switch, the leaf switch 2 may also generate a routing entry based on the route, and change the next hop address of the route to the virtual IP address of the leaf switch 2.

S9: The leaf switch 1 sends, to the server, the route whose next-hop address is changed.

S10: The server generates a user data packet A and a user data packet B that include a virtual MAC address.

After receiving the route sent by the leaf switch 1, the server may generate a routing entry based on the destination address and the next-hop address in the route, so as to implement subsequent sending of a route-related user data packet. The routing entry generated by the server includes the destination address (1.1.1.1) and the virtual IP address (2.1.1.1) of the first network device.

When the server sends user data to the network device whose address is 1.1.1.1, the server generates the user data packet A and the user data packet B whose destination addresses are both 1.1.1.1, where the user data packet A and the user data packet B belong to same user traffic. Then, the server searches a routing entry on a third network device based on the destination address 1.1.1.1, and determines that next hop addresses of the user data packet A and the user data packet B are the virtual IP address 2.1.1.1. Based on the virtual IP address 2.1.1.1, the server obtains a virtual MAC address 0000-5e00-0100 corresponding to the virtual IP address 2.1.1.1. Finally, the server updates the user data packet A and the user data packet B based on the virtual MAC address, to obtain the updated user data packet A and the user data packet B. The updated user data packet A and the user data packet B both include the destination address 1.1.1.1 and the virtual MAC address 0000-5e00-0100.

S11: The server separately sends the user data packet A and the user data packet B that belong to same user traffic to the leaf switch 1 and the leaf switch 2.

After obtaining the user data packet A and the user data packet B with the destination address 1.1.1.1 and the virtual MAC address 0000-5e00-0100, the server sends the user data packet A and the user data packet B. When the leaf switch 1 and the leaf switch 2 perform load balancing on the packets sent by the server, the user data packet A sent by the server is sent to the leaf switch 1 according to the hash algorithm, and the user data packet B is sent to the leaf switch 2 according to the hash algorithm. In other words, the server sends the user data packet A to the leaf switch 1, and sends the user data packet B to the leaf switch 2.

S12: The leaf switch 1 sends the user data packet A to the spine switch.

After the leaf switch 1 receives the user data packet A sent by the server, the leaf switch 1 searches, based on the destination address of the user data packet A, for an outbound interface, namely, the interface connected to the leaf switch 1 and the spine switch.

After obtaining the outbound interface corresponding to the user data packet A by searching, the leaf switch 1 may send the user data packet A to the spine switch based on the outbound interface obtained by searching, so that the spine switch continues to forward the user data packet.

S13: The leaf switch 2 sends the user data packet B to the spine switch.

Similarly, after receiving the user data packet B, the leaf switch 2 may also send the user data packet B to the spine switch by searching for the outbound interface.

The foregoing describes a process in which the third network device sends the protocol packet and the user data packet based on the physical MAC address and the virtual MAC address. The following describes a process in which the third network device obtains the physical MAC address and the virtual MAC address.

Figure 7:
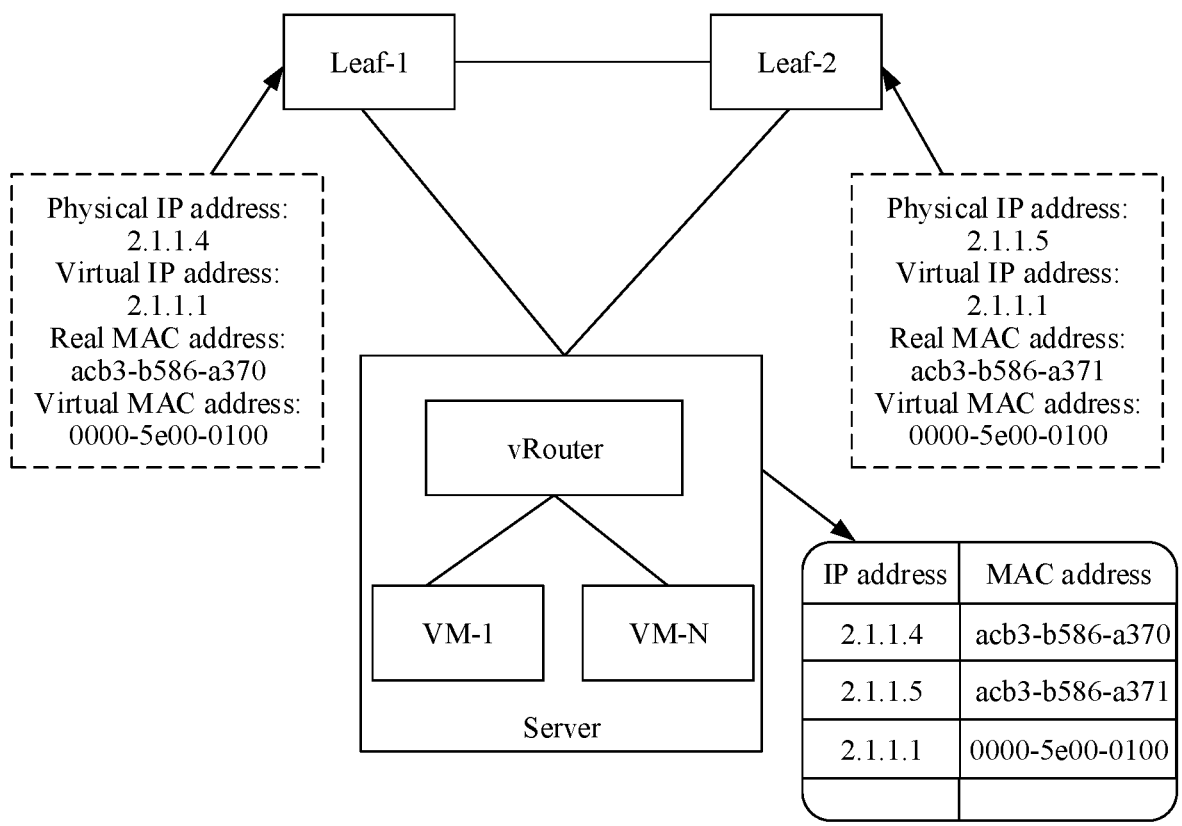
FIG. 7 is a schematic diagram of a network system architecture according to an embodiment of this application.

FIG. 7 is a schematic diagram of a network system architecture according to an embodiment of this application. As shown in FIG. 7, the first network device may be the leaf switch 1 in FIG. 7, the second network device may be the leaf switch 2 in FIG. 7, and the third network device may be the server in FIG. 7. Both the leaf switch 1 and the leaf switch 2 store a physical IP address, a virtual IP address, a real MAC address, and a virtual MAC address.

On the leaf switch 1, the physical IP address is 2.1.1.4, the virtual IP address is 2.1.1.1, the real MAC address is acb3-b586-a370, the virtual MAC address is 0000-5e00-0100, there is a correspondence between the physical IP address and the real MAC address, and there is a correspondence between the virtual IP address and the virtual MAC address.

On the leaf switch 2, the physical IP address is 2.1.1.5, the virtual IP address is 2.1.1.1, the real MAC address is acb3-b586-a371, the virtual MAC address is 0000-5e00-0100, there is a correspondence between the physical IP address and the real MAC address, and there is a correspondence between the virtual IP address and the virtual MAC address. The virtual IP address of the leaf switch 1 and the virtual IP address of the leaf switch 2 are the same, and the virtual MAC address of the leaf switch 1 and the virtual MAC address of the leaf switch 2 are the same.

The server is configured with the physical IP address of the leaf switch 1, the physical IP address of the leaf switch 2, and the virtual IP address common to the leaf switch 1 and the leaf switch 2. The server may obtain the physical MAC address of the leaf switch 1 by sending, to the leaf switch 1, a request message including the physical IP address of the leaf switch 1. The server may obtain the physical MAC address of the leaf switch 2 by sending, to the leaf switch 2, a request message including the physical IP address of the leaf switch 2. In addition, the server may further obtain, by sending a request message including the virtual IP address to the leaf switch 1 or the leaf switch 2, the virtual MAC addresses corresponding to the leaf switch 1 and the leaf switch 2. In this way, after obtaining the corresponding MAC address, the server may establish a correspondence between the IP address and the MAC address. In other words, the physical IP address 2.1.1.4 corresponds to the physical MAC address acb3-b586-a370, the physical IP address 2.1.1.5 corresponds to the physical MAC address acb3-b586-a371, and the virtual IP address 2.1.1.1 corresponds to the virtual MAC address 0000-5e00-0100.

Figure 8:
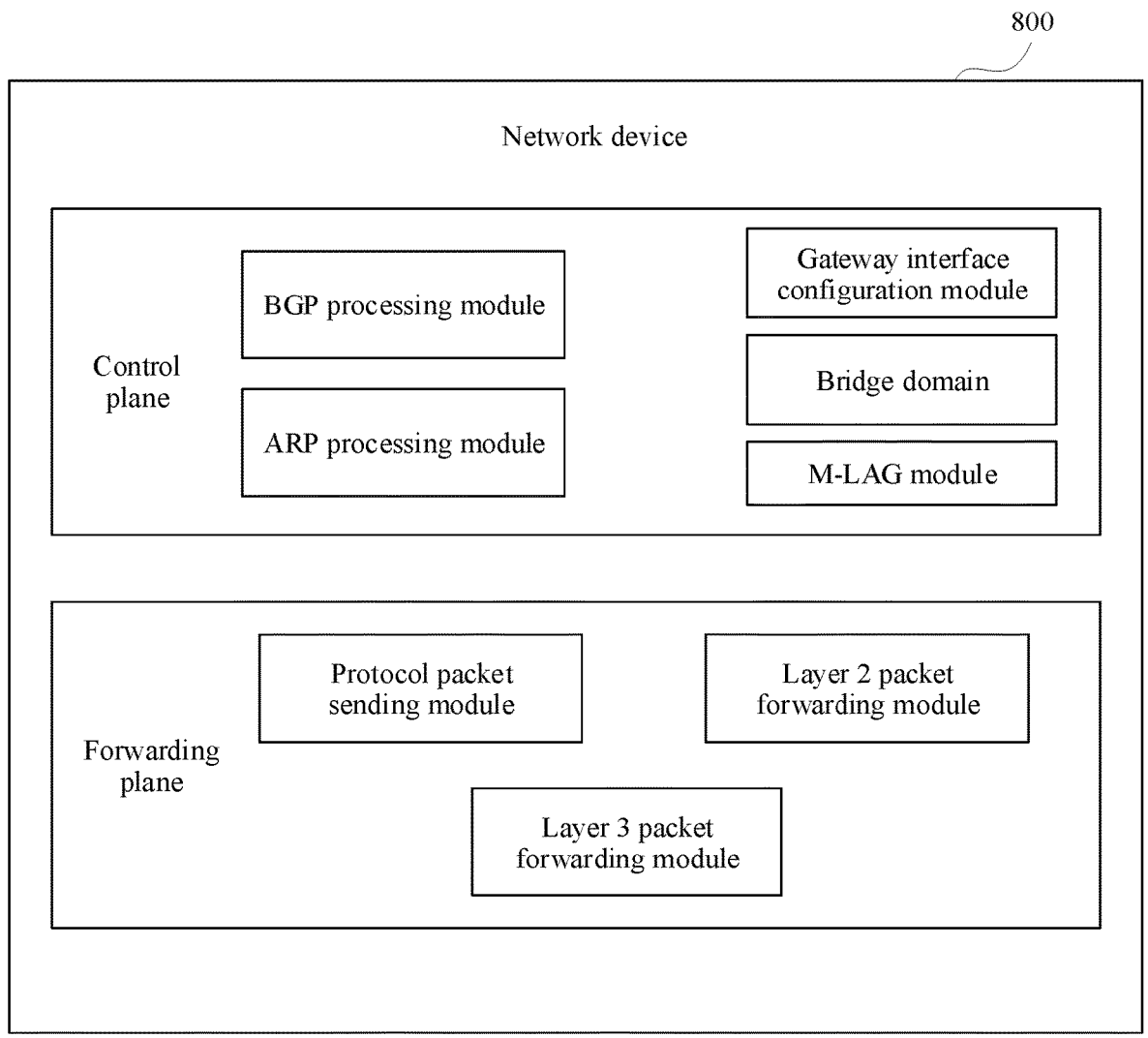
FIG. 8 is a schematic diagram of a structure of a network device according to an embodiment of this application.

To implement the foregoing embodiments, this application further provides a network device. FIG. 8 is a schematic diagram of a structure of a network device 800 according to an embodiment of this application. As shown in FIG. 8, the network device 800 may be, for example, the first network device or the second network device.

In a possible example, a control plane of the network device 800 may include a BGP processing module, an ARP processing module, a gateway interface configuration module, a bridge domain, and an M-LAG module. The BGP processing module is configured to: establish a BGP session with a server by using a physical IP address of a gateway interface, configure a routing policy, and fill a next hop address of a route sent to the server as a virtual IP address. The ARP processing module is configured to process an ARP request. For example, when obtaining the ARP request message including the physical IP address, the ARP processing module sends an ARP response message including a virtual MAC address. The gateway interface configuration module is configured to configure an IP address and a MAC address corresponding to the gateway interface, where the IP address and the MAC address include a physical IP address, a virtual IP address, a physical MAC address, and a virtual MAC address. The M-LAG module is configured to be responsible for M-LAG related configuration and protocol processing, so that a multi-chassis LAG binding relationship can be formed between access ports of the leaf switches. A bridge domain is used to: add an M-LAG member interface to a corresponding bridge domain, configure a peer link, and add the peer link to the bridge domain where the M-LAG member interface is located. The M-LAG members, that is, the leaf switch 1 and the leaf switch 2, can perform Layer 2 communication through the configured peer link. In addition, the bridge domain may be further configured to implement split horizon for a packet between the configured peer link and a local access port of an M-LAG, so as to prevent a packet loop caused by the leaf switch by forwarding the packet received from the peer link to the local port of the M-LAG.

A forwarding plane of the network device 800 may include a protocol packet sending module, a Layer 2 packet forwarding module, and a Layer 3 packet forwarding module. The protocol packet sending module is configured to send the protocol packet to the control plane. For example, after the network device 800 receives the packet from the physical port, the protocol packet sending module identifies that the packet is a protocol packet such as an ARP packet or a BGP packet, and sends the packet to the control plane. The Layer 2 packet forwarding module is configured to implement Layer 2 forwarding of the packet. For example, after the network device 800 receives the packet from the physical port, if a MAC address in the packet is a broadcast, unknown-unicast, and multicast (BUM) address, that is, the MAC address of the packet is unknown, the Layer 2 packet forwarding module performs Layer 2 broadcast processing in the corresponding bridge domain. If the MAC address of the packet is known, the Layer 2 packet forwarding module searches for a MAC forwarding entry and forwards the packet. The Layer 3 packet forwarding module is configured to implement Layer 2 forwarding of a packet. For example, after the network device 800 receives the user data packet from the physical port, if a MAC address of the user data packet is the virtual MAC address of the gateway interface, the Layer 3 packet forwarding module performs Layer 2 termination, and searches a routing table to perform Layer 3 forwarding. In other words, the Layer 3 packet forwarding module sends the user data packet to an upstream network through an upstream interface.

Figure 9:
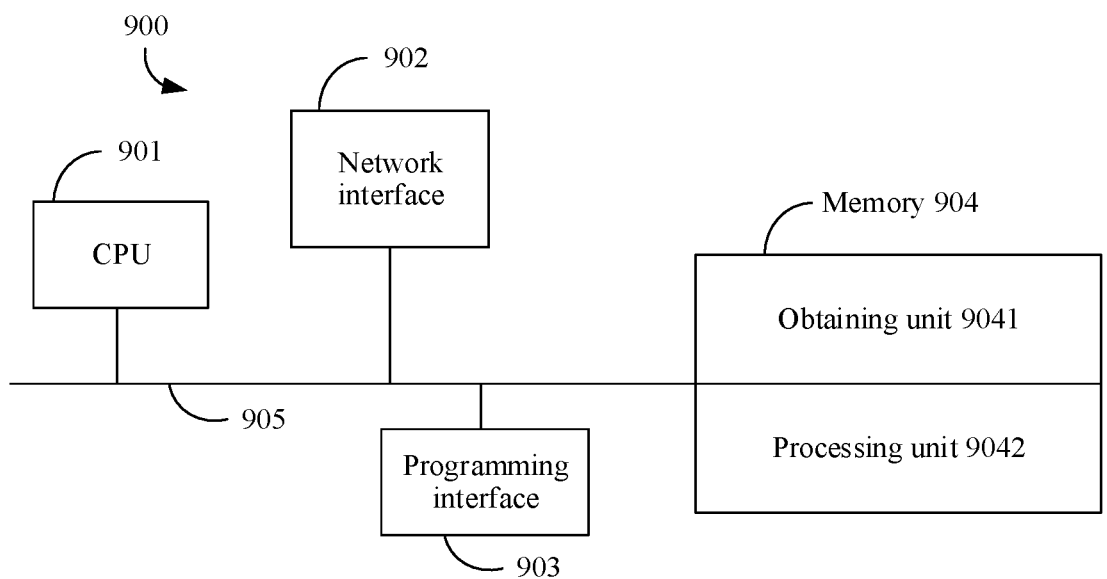
FIG. 9 is a schematic diagram of a structure of a network device according to an embodiment of this application.

FIG. 9 is a schematic diagram of a structure of a network device 900 according to an embodiment of this application. Although the network device 900 shown in FIG. 9 shows some specific features, a person skilled in the art may be aware from the embodiments of this application that, for brevity, FIG. 9 does not show various other features, to avoid confusing more related aspects of the embodiments disclosed in the embodiments of this application. For this purpose, as an example, in some embodiments, the network device 900 includes one or more processing units (e.g., cpu) 901, a network interface 902, a programming interface 903, a memory 904, and one or more communications buses 905 that are configured to interconnect various components. In some embodiments, some functional components or units may be omitted or added to the network device 900 based on the foregoing example.

In some embodiments, in addition to another purpose, the network interface 902 is configured to connect to one or more other network devices/servers in a network system. In some embodiments, the communications bus 905 includes a circuit that interconnects system components and controls communication between the system components. The memory 904 may include a non-volatile memory, for example, a read-only memory (ROM), a programmable read-only memory (PROM), an erasable programmable read-only memory (EPROM), an electrically erasable programmable read-only memory (EEPROM), or a flash memory. The memory 904 may also include a volatile memory. The volatile memory may be a random access memory (RAM), and is used as an external cache.

In some embodiments, a non-transitory computer-readable storage medium of the memory 904 or the memory 904 stores the following programs, modules, and data structures, or a subset thereof, and for example, includes a transceiver unit (not shown in the figure), an obtaining unit 9041, and a processing unit 9042.

In a possible embodiment, the network device 900 may have any function implemented by the first network device, the second network device, or the third network device in the foregoing method embodiments.

It should be understood that the network device 900 corresponds to the first network device, the second network device, or the third network device in the foregoing method embodiments, and modules in the network device 900 and the foregoing other operations and/or functions are respectively used to implement various operations and methods implemented by the network devices in the foregoing method embodiments. For details, refer to the method embodiments described above. For brevity, details are not described herein again.

It should be understood that the foregoing function of the transceiver unit may be implemented by the processor by invoking program code in the memory, and cooperation with the network interface 902 is performed when necessary. Alternatively, a data receiving/sending operation may be completed by the network interface 902 on the network device 900.

In various embodiments, the network device 900 is configured to perform the packet processing method provided in the embodiments of this application, for example, perform the packet processing method corresponding to the embodiment shown in FIG. 2.

Corresponding to the method embodiment and the virtual apparatus embodiment provided in this application, an embodiment of this application further provides a network device. The following describes a hardware structure of the network device.

Figure 10:
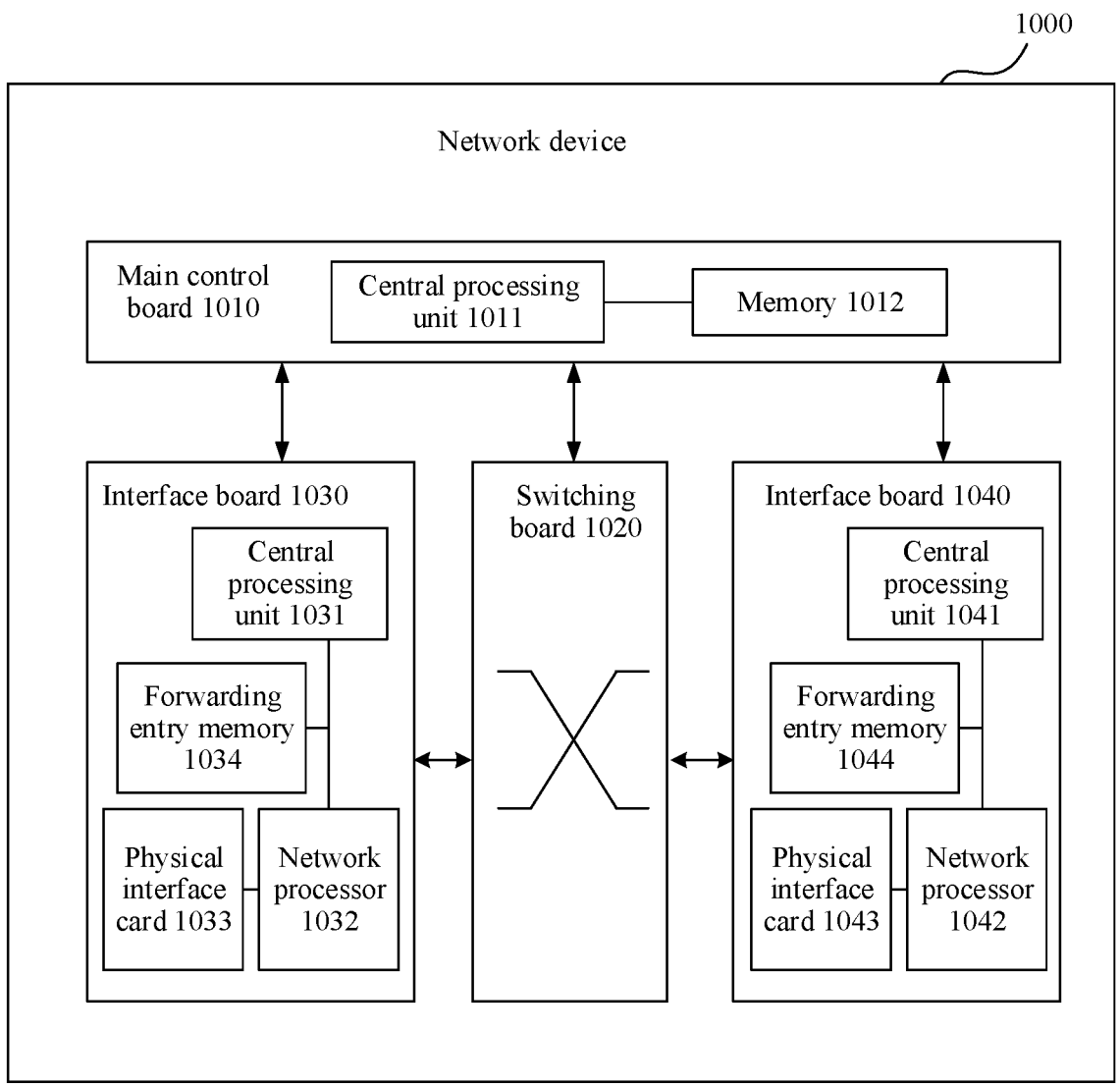
FIG. 10 is a schematic diagram of a structure of a network device according to an embodiment of this application.

FIG. 10 is a schematic diagram of a structure of a network device 1000 according to an embodiment of this application. The network device 1000 may be configured as the first network device, the second network device, or the third network device in the foregoing method embodiments.

For example, the network device 1000 may correspond to the first network device in the foregoing method embodiments. Hardware, modules, and the foregoing other operations and/or functions in the network device 1000 are separately used to implement various operations and methods implemented by the first network device in the method embodiments. For details of a detailed procedure about how the network device 1000 forwards a packet, refer to the foregoing method embodiments. For brevity, details are not described herein again. Operations in the foregoing method embodiments can be implemented by using a hardware integrated logic circuit in the processor in the network device 1000, or by using an instruction in a form of software. The operations of the method disclosed with reference to the embodiments of this application may be directly performed by a hardware processor, or may be performed by using a combination of hardware and a software module in the processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the operations in the foregoing methods in combination with hardware of the processor. To avoid repetition, details are not described herein again.

The network device 1000 may also correspond to the network device 900 in the foregoing virtual apparatus embodiment, and each functional module in the network device 900 is implemented by using software and hardware of the network device 1000. In a possible embodiment, the functional modules included in the network device 900 are generated after a processor of the network device 1000 reads program code stored in the memory, or are jointly implemented by the processor of a network device 1000 reads program code stored in the memory and cooperates with a communications interface.

The network device 1000 includes a main control board 1010 and an interface board 1030.

The main control board 1010 is also referred to as a main processing unit (MPU) or a route processing card (route processor card). The main control board 1010 controls and manages components in the network device 1000, including functions such as routing calculation, device management, device maintenance, and protocol processing. The main control board 1010 includes a central processing unit 1011 and a memory 1012.

The interface board 1030 is also referred to as a line interface unit (line processing unit, LPU), a line card, or a service board. The interface board 1030 is configured to provide various service interfaces and forward a data packet. The service interfaces include but are not limited to an Ethernet interface, a POS (Packet over SONET/SDH) interface, and the like. The Ethernet interface is, for example, a flexible Ethernet service interface (Flexible Ethernet Clients, FlexE Clients). The interface board 1030 includes a central processing unit 1031, a network processor 1032, a forwarding entry memory 1034, and a physical interface card (PIC) 1033.

The central processing unit 1031 on the interface board 1030 is configured to control and manage the interface board 1030 and communicate with the central processing unit 1011 on the main control board 1010.

The network processor 1032 is configured to forward and process a packet. A form of the network processor 1032 may be a forwarding chip. Specifically, processing of an uplink packet includes processing at a packet ingress interface and forwarding table searching, and processing of a downlink packet includes forwarding table searching and the like.

The physical interface card 1033 is configured to implement a physical-layer interconnection function. Original traffic enters the interface board 1030 from the physical interface card 1033, and a processed packet is sent from the physical interface card 1033. The physical interface card 1033 includes at least one physical interface, and the physical interface is also referred to as a physical interface. The physical interface card 1033 corresponds to a FlexE physical interface in a system architecture. The physical interface card 1033 is also referred to as a subcard and may be installed on the interface board 1030, and is responsible for converting an optoelectronic signal into a packet, performing validity check on the packet, and then forwarding the packet to the network processor 1032 for processing. In some embodiments, the central processing unit 1031 on the interface board 1003 may also perform a function of the network processor 1032, for example, implementing software forwarding based on a general-purpose CPU, so that the network processor 1032 is not required in the physical interface card 1033.

In some embodiments, the network device 1000 includes a plurality of interface boards. For example, the network device 1000 further includes an interface board 1040, and the interface board 1040 includes a central processing unit 1041, a network processor 1042, a forwarding entry memory 1044, and a physical interface card 1043.

In some embodiments, the network device 1000 further includes a switching board 1020. The switching board 1020 may also be referred to as a switch fabric unit (SFU). When the network device has a plurality of interface boards 1030, the switching board 1020 is configured to complete data exchange between the interface boards. For example, the interface board 1030 and the interface board 1040 may communicate with each other by using the switching board 1020.

The main control board 1010 is coupled to the interface board 1030. For example, the main control board 1010, the interface boards 1030 and 1040, and the switching board 1020 are connected to a system backplane through a system bus to communicate with each other. In a possible embodiment, an inter-process communication (IPC) channel is established between the main control board 1010 and the interface board 1030, and the main control board 1010 and the interface board 1030 communicate with each other through the IPC channel.

Logically, the network device 1000 includes a control plane and a forwarding plane. The control plane includes the main control board 1010 and the central processing unit 1031. The forwarding plane includes components that perform forwarding, such as the forwarding entry memory 1034, the physical interface card 1033, and the network processor 1032. The control plane performs functions such as a function of a router, generating a forwarding table, processing signaling and protocol packets, and configuring and maintaining a status of a device. The control plane delivers the generated forwarding table to the forwarding plane. On the forwarding plane, the network processor 1032 searches the forwarding table delivered by the control plane to forward a packet received by the physical interface card 1033. The forwarding table delivered by the control plane may be stored in the forwarding entry memory 1034. In some embodiments, the control plane and the forwarding plane may be totally separated, and are not on a same device.

It should be understood that the transceiver unit in the network device 900 may be equivalent to the physical interface card 1033 or the physical interface card 1043 in the network device 1000. The obtaining unit 11041 and the processing unit 11042 in the network device 900 may be equivalent to the central processing unit 1011 or the central processing unit 1031 in the network device 1000.

It should be understood that in this embodiment of this application, an operation on the interface board 1040 is the same as an operation on the interface board 1030. For brevity, details are not described again. It should be understood that the network device 1000 in this embodiment may correspond to the first network device in the foregoing method embodiments. The main control board 1010, the interface board 1030, and/or the interface board 1040 in the network device 1000 may implement functions and/or various operations of the first network device, the second network device, or the third network device in the foregoing method embodiments. For brevity, details are not described herein again.

It should be noted that, there may be one or more main control boards. When there are a plurality of main control boards, the main control boards may include an active main control board and a standby main control board. There may be one or more interface boards, and a network device having a stronger data processing capability provides more interface boards. There may also be one or more physical interface cards on the interface board. There may be no switching board or may be one or more switching boards. When there are a plurality of switching boards, the switching boards may jointly implement load sharing and redundancy backup. In a centralized forwarding architecture, the network device may not need the switching board, and the interface board provides a function of processing service data in an entire system. In a distributed forwarding architecture, the network device may have at least one switching board, and data exchange between a plurality of interface boards is implemented by using the switching board, to provide a large-capacity data exchange and processing capability. Therefore, a data access and processing capability of a network device in the distributed architecture is better than that of a device in the centralized architecture. In some embodiments, the network device may alternatively be in a form in which there is only one card. For example, there is no switching board, and functions of the interface board and the main control board are integrated on the card. In this case, the central processing unit on the interface board and the central processing unit on the main control board may be combined into one central processing unit on the card, to perform functions obtained after the two central processing units are combined. The device in this form (for example, a network device such as a low-end switch or router) has a relatively weak data exchange and processing capability. Which architecture is specifically used depends on a particular networking deployment scenario, and is not uniquely limited herein.

In some possible embodiments, each network device may be implemented as a virtualized device. For example, the virtualized device may be a virtual machine (VM) that runs a program having a packet sending function, and the virtual machine is deployed on a hardware device (for example, a physical server). The virtual machine is a complete computer system that is simulated by using software, has a complete hardware system function, and runs in a completely isolated environment. The virtual machine may be configured as the first network device. For example, the first network device may be implemented based on a general-purpose physical server in combination with a network functions virtualization (NFV) technology. The first network device is a virtual host, a virtual router, or a virtual switch. After reading this application, with reference to the NFV technology, a person skilled in the art may virtualize, on the general physical server, the first network devices having the foregoing functions. Details are not described herein.

It should be understood that the network devices in the foregoing product forms separately have any function implemented by each network device in the foregoing method embodiments. Details are not described herein.

An embodiment of this application provides a computer program product. When the computer program product runs on a network device, the network device is enabled to perform the method performed by the first network device in the method embodiment corresponding to FIG. 2.

An embodiment of this application further provides a chip, including a processor and an interface circuit. The interface circuit is configured to receive an instruction and transmit the instruction to the processor. The processor is coupled to a memory, the memory is configured to store programs or instructions, and when the programs or the instructions are executed by the processor, the chip system is enabled to implement the method in any one of the foregoing method embodiments.

In some embodiments, there may be one or more processors in the chip system. The processor may be implemented by using hardware or software. When being implemented by using hardware, the processor may be a logic circuit, an integrated circuit, or the like. When being implemented by using software, the processor may be a general-purpose processor, and is implemented by reading software code stored in the memory.

In some embodiments, there may be one or more memories in the chip system. The memory may be integrated with the processor, or may be disposed separate from the processor. This is not limited in this application. For example, the memory may be a non-transitory processor, for example, a read-only memory ROM. The memory and the processor may be integrated on a same chip, or may be separately disposed on different chips. A type of the memory and a manner of disposing the memory and the processor are not specifically limited in this application.

For example, the chip system may be a field programmable gate array (FPGA), may be an application-specific integrated circuit (ASIC), may be a system-on-a-chip (SoC), may be a central processing unit (CPU), may be a network processor (NP), may be a digital signal processor (DSP), may be a micro controller unit (MCU), or may be a programmable logic device (PLD) or another integrated chip.

The foregoing describes the embodiments of this application in detail. Operations in the methods in the embodiments of this application may be sequentially scheduled, combined, or deleted according to an actual requirement. Modules in the apparatus in the embodiments of this application may be divided, combined, or deleted according to an actual requirement.

It should be understood that "an embodiment" or "one embodiment" mentioned in the entire specification means that particular features, structures, or characteristics related to the embodiment are included in at least one embodiment of this application. Therefore, "in an embodiment" or "in one embodiment" appearing throughout the specification does not necessarily refer to a same embodiment. In addition, these particular features, structures, or characteristics may be combined in one or more embodiments in any appropriate manner. It should be understood that, in the embodiments of this application, sequence numbers of the foregoing processes do not mean execution sequences. The execution sequences of the processes should be determined based on functions and internal logic of the processes, and should not constitute any limitation to implementation processes of the embodiments of this application.

The term "and/or" in this specification describes only an association relationship for describing associated objects and represents that three relationships may exist. For example, A and/or B may represent the following three cases: only A exists, both A and B exist, and only B exists. In addition, the character "/" in this specification usually indicates an "or" relationship between the associated objects.

It should be understood that, in the embodiments of this application, "B corresponding to A" indicates that B is associated with A, and B may be determined based on A. However, it should be further understood that determining B based on A does not mean that B is determined based on only A. B may alternatively be determined based on A and/or other information.

A person of ordinary skill in the art may be aware that, in combination with the examples described in the embodiments disclosed in this specification, units and algorithm operations may be implemented by electronic hardware, computer software, or a combination thereof. To clearly describe interchangeability between the hardware and the software, the foregoing generally describes a composition and operations of each example based on functions. Whether the functions are performed by hardware or software depends on particular applications and design constraint conditions of the technical solutions. A person skilled in the art may use different methods to implement the described functions for each particular application, but it should not be considered that the embodiment goes beyond the scope of this application.

It may be clearly understood by a person skilled in the art that, for convenient and brief description, for a detailed working process of the foregoing system, apparatus, and unit, refer to a corresponding process in the foregoing method embodiments. Details are not described herein again.

In the several embodiments provided in this application, it should be understood that the disclosed systems, apparatuses, and methods may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one location, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software function unit and sold or used as an independent product, the integrated unit may be stored in a computer-readable storage medium. Based on such an understanding, the technical solutions of this application essentially, or the part contributing to the conventional technology, or all or some of the technical solutions may be implemented in a form of a software product. The computer software product is stored in a storage medium and includes several instructions for instructing a computer device (which may be a personal computer, a server, a network device/server, or the like) to perform all or some of the operations of the methods in the embodiments of this application. The foregoing storage medium includes: any medium that can store program code, such as a USB flash drive, a removable hard disk, a read-only memory, a random access memory, a magnetic disk, or an optical disc.

What is claimed is:

1. A packet processing method comprising:
   receiving, by a first network device in a network system, a protocol packet from a third network device multi-homed to the first network device and a second network device, wherein the protocol packet comprises a second physical media access control (MAC) address associated with the second network device, wherein the network system comprises the first network device, a second network device, and the third network device, wherein the first network device is configured with a first physical MAC address and a virtual MAC address, wherein the second network device is configured with the second physical MAC address and the virtual MAC address, wherein the virtual MAC address is used to forward a user data packet to a network side, wherein the protocol packet received by the first network device from the third network device comprises a time to live (TTL), and wherein the TTL in the protocol packet forwarded by the first network device to the second network device is not decreased by 1; and
   forwarding, by the first network device, the protocol packet to the second network device based on the second physical MAC address.

2. The method according to claim 1, wherein the method further comprises:
   receiving, by the first network device, a request message from the third network device, wherein the request message comprises a physical internet protocol (IP) address of the first network device; and
   sending, by the first network device, a response message to the third network device, wherein the response message comprises the first physical MAC address, and wherein there is a correspondence between the first physical MAC address and the physical IP address of the first network device.

3. The method according to claim 2, wherein the request message is an address resolution protocol (ARP) request message or a neighbor discovery message.

4. The method according to claim 1, wherein the forwarding, by the first network device, the protocol packet to the second network device based on the second physical MAC address comprises:
   searching, by the first network device, a MAC forwarding entry based on the second physical MAC address to obtain a first outbound interface corresponding to the protocol packet; and forwarding, by the first network device, the protocol packet to the second network device based on the first outbound interface.

5. The method according to claim 1, wherein the forwarding, by the first network device, the protocol packet to the second network device based on the second physical MAC address comprises:
forwarding, by the first network device, the protocol packet to the second network device in a broadcast manner based on the second physical MAC address.

6. The method according to claim 1, wherein the protocol packet comprises a border gateway protocol (BGP) packet, a bidirectional forwarding detection (BFD) protocol packet, an open shortest path first (OSPF) protocol packet, or an intermediate system to intermediate system (IS-IS) protocol packet.

7. The method according to claim 1, wherein the method further comprises:
receiving, by the first network device, the user data packet from the third network device;
searching, by the first network device, a routing entry based on the virtual MAC address comprised in the user data packet, to obtain a second outbound interface; and
forwarding, by the first network device, the user data packet through the second outbound interface.

8. A third network device in a network system, the third network device comprising a processor and a memory, wherein the memory is configured to store instructions, and the processor is configured to execute the instructions in the memory, so that the third network device performs operations comprising:
sending a request message, wherein the request message comprises a physical internet protocol (IP) address of a first network device, wherein the network system comprises the first network device, a second network device, and the third network device, and wherein the third network device is multi-homed to the first network device and the second network device;
receiving a response message, wherein the response message comprises a physical media access control (MAC) address of the first network device, and wherein there is a correspondence between the physical IP address of the first network device and the physical MAC address of the first network device; and
sending a protocol packet, wherein the protocol packet comprises the physical MAC address, and wherein the physical MAC address is used by the first network device to forward the protocol packet to the second network device.

9. The third network device according to claim 8, wherein the operations further comprise:
receiving a route sent by the first network device, wherein the route comprises a destination address of a user and a next-hop address, and wherein the next-hop address is a virtual IP address of the first network device.

10. The third network device according to claim 9, wherein the operations further comprise:
generating a user data packet, wherein the user data packet comprises the destination address of the user;
searching a routing entry based on the destination address of the user to determine that the next-hop address of the user data packet is the virtual IP address of the first network device;
obtaining a virtual MAC address corresponding to the virtual IP address of the first network device; and updating the user data packet based on the virtual MAC address, to obtain an updated user data packet, wherein the updated user data packet comprises the virtual MAC address.

11. The third network device according to claim 8, wherein the request message is an address resolution protocol (ARP) request message or a neighbor discovery message.

12. The third network device according to claim 8, wherein the protocol packet comprises a border gateway protocol (BGP) packet, a bidirectional forwarding detection (BFD) protocol packet, an open shortest path first (OSPF) protocol packet, or an intermediate system to intermediate system (IS-IS) protocol packet.

13. A first network device in a network system, the first network device comprising a processor and a memory, wherein the memory is configured to store instructions, and the processor is configured to execute the instructions in the memory, so that the first network device performs operations comprising:
receiving a protocol packet from a third network device multi-homed to the first network device and a second network device, wherein the protocol packet comprises a second physical media access control (MAC) address associated with the second network device, wherein the network system comprises the first network device, the second network device, and the third network device, wherein the first network device is configured with a first physical MAC address and a virtual MAC address, wherein the second network device is configured with the second physical MAC address and the virtual MAC address, wherein the virtual MAC address is used to forward a user data packet to a network side, wherein the protocol packet received by the first network device from the third network device comprises a time to live (TTL), and wherein the TTL in the protocol packet forwarded by the first network device to the second network device is not decreased by 1; and
forwarding the protocol packet to the second network device based on the second physical MAC address.

14. The first network device according to claim 13, wherein the operations further comprise:
receiving a request message from the third network device, wherein the request message comprises a physical internet protocol (IP) address of the first network device; and
sending a response message to the third network device, wherein the response message comprises the first physical MAC address, and there is a correspondence between the first physical MAC address and the physical IP address of the first network device.

15. The first network device according to claim 14, wherein the request message is an address resolution protocol (ARP) request message or a neighbor discovery message.

16. The first network device according to claim 13, wherein the forwarding the protocol packet to the second network device based on the second physical MAC address comprises:
searching a MAC forwarding entry based on the second physical MAC address to obtain a first outbound interface corresponding to the protocol packet; and
forwarding the protocol packet to the second network device based on the first outbound interface.

17. The first network device according to claim 13, wherein the forwarding the protocol packet to the second network device based on the second physical MAC address comprises:
   forwarding the protocol packet to the second network device in a broadcast manner based on the second physical MAC address.

18. The first network device according to claim 13, wherein the protocol packet comprises a border gateway protocol (BGP) packet, a bidirectional forwarding detection (BFD) protocol packet, an open shortest path first (OSPF) protocol packet, or an intermediate system to intermediate system (IS-IS) protocol packet.

* * * * *